United States Patent
Hamano

[11] Patent Number: 5,521,758
[45] Date of Patent: May 28, 1996

[54] VARIABLE-MAGNIFICATION OPTICAL SYSTEM CAPABLE OF IMAGE STABILIZATION

[75] Inventor: Hiroyuki Hamano, Kanagawa-ken, Japan

[73] Assignee: Canon Kabushiki Kaisha, Tokyo, Japan

[21] Appl. No.: 338,211

[22] Filed: Nov. 9, 1994

Related U.S. Application Data

[63] Continuation of Ser. No. 77,870, Jun. 18, 1993, abandoned.

[30] Foreign Application Priority Data

Jun. 19, 1992 [JP] Japan .................................. 4-186185
Nov. 18, 1992 [JP] Japan .................................. 4-333594

[51] Int. Cl.⁶ ...................................................... G02B 27/00
[52] U.S. Cl. .......................... 359/557; 359/554; 359/683; 359/684; 359/689; 359/754
[58] Field of Search ........................... 350/500; 359/554, 359/684, 689, 754, 557

[56] References Cited

U.S. PATENT DOCUMENTS

| | | |
|---|---|---|
| 2,959,088 | 11/1960 | Räntsch . |
| 4,998,809 | 3/1991 | Tsuji .......................................... 350/500 |
| 5,138,492 | 8/1992 | Tsuji et al. . |
| 5,221,994 | 6/1993 | Nishio ..................................... 359/708 |

FOREIGN PATENT DOCUMENTS

| | | |
|---|---|---|
| 50-137555 | 10/1975 | Japan . |
| 56-21133 | 5/1981 | Japan . |
| 56-34847 | 8/1981 | Japan . |
| 57-7414 | 2/1982 | Japan . |
| 61-223819 | 10/1986 | Japan . |
| 63-115126 | 5/1988 | Japan . |
| 2-93620 | 4/1990 | Japan . |
| 2238429 | 9/1990 | Japan . |

*Primary Examiner*—Viet Q. Nguyen
*Attorney, Agent, or Firm*—Fitzpatrick, Cella, Harper & Scinto

[57] ABSTRACT

A variable magnification optical system comprises, from front to rear, a lens unit which is stationary during variation of the magnification and during focusing and a portion for varying the magnification. The lens unit comprises a fixed front lens sub-unit and a rear lens sub-unit which is arranged to tilt with its tilting center at a point on the optical axis to correct the image shake. At least one lens surface in the front lens sub-unit is formed to such an aspheric shape that a positive refractive power gets progressively stronger toward a marginal portion thereof. The following conditions are set forth:

$$0.5 < |f1b/L| < 1.2$$

$$0.53 < |f1b/fT| < 0.65$$

where f1b is the focal length of the rear lens sub-unit, L is the distance from a rear principal point of the rear lens sub-unit to the tilting center, and fT is the longest focal length of the entire lens system.

10 Claims, 21 Drawing Sheets

VARIABLE-MAGNIFICATION OPTICAL SYSTEM CAPABLE OF IMAGE STABILIZATION

This application is a continuation of application Ser. No. 08/077,870 filed Jun. 18, 1993, now abandoned.

BACKGROUND OF THE INVENTION

1. Field of the Invention

This invention relates to variable-magnification optical systems having the function of image stabilization and, more particularly, to a variable-magnification optical system of which part, or a lens unit, is made to relatively tilt with its tilting center at a point on an optical axis so that when the optical system vibrates (tilts), shaking of a photographed image is optically corrected to obtain a stationary image, thus achieving good stabilization of the photographed image, and getting the function of image stabilization suited to photographic cameras or video cameras.

2. Description of the Related Art

When a photograph is taken from a moving car, flying aircraft, or moving vehicle, vibrations propagate to the photographic system, causing a photographed image to shake.

There have been proposed a wide variety of optical systems having the function of preventing an image of an object being photographed from shaking, i.e., or image-stabilizing optical systems.

For example, Japanese Patent Publication No. Sho 56-21133 discloses an optical instrument, in which vibrations thereof are detected by a sensor, and, in response to an output signal of the sensor, an optical member constituting part of the optical instrument is moved in such a direction as to cancel a vibratory displacement of the image caused by the vibrations, so that the image is stabilized.

Japanese Laid-Open Patent Application No. Sho 61-223819 discloses a photographic system with a refraction type variable angle prism arranged in the frontmost position, wherein the apex angle of the prism is varied in response to vibrations of the photographic system to thereby deflect the image. Thus, the image is stabilized.

In Japanese Patent Publications Nos. Sho 56-34847 and Sho 57-7414, the photographic system is provided with a component or an optical member arranged to be spatially fixed against vibrations. As the photographic system vibrates, this optical member produces a prism effect by which the photographed image is deflected. Thus, a stationary image is obtained on the image plane.

Also, in Japanese Laid-Open Patent Application No. Sho 50-137555, for a telephoto lens, a lens unit on the object side is made to tilt around a point on an optical axis its focal length distant from its principal point, so that shaking of the photographed image is corrected when the telephoto lens vibrates.

In Japanese Laid-Open Patent Application No. Sho 63-115126, another method is employed by utilizing an acceleration sensor or the like in detecting vibrations of the photographic system. Responsive to the signal produced by the acceleration sensor, a lens unit constituting part of the photographic system is made to shift in a direction perpendicular to the optical axis, so that a stationary image is obtained.

In addition, Japanese Laid-Open Patent Application No. Hei 2-238429 and U.S. Pat. No. 2,959,088 propose the utilization of an inertial pendulum mechanism in the image stabilizing system. A lens system composed of two lens units or first and second lens units of negative and positive powers is arranged in front of the photographic system, and the second lens unit is made movable as the photographic system vibrates. For image stabilization, the second lens unit is supported in gimbal fashion on its focal position.

In general, the image-stabilizing instrument of the type using the method of tilting a movable lens unit of the image-stabilizing optical system placed in front of the photographic system to remove the shaking of the photographed image so as to obtain a stationary image has problems that the instrument as a whole gets a large size and that a moving mechanism for the movable lens unit becomes complicated in structure.

Another problem arises in that the tilting of the movable lens unit produces a large amount of decentering aberrations, causing the optical performance to be significantly reduced.

The image-stabilizing optical system utilizing the variable-angle prism has a problem that at the time of the image stabilizing operation, the amount of decentering lateral chromatic aberrations increases largely as zooming goes particularly to the positions of long focal lengths (telephoto side).

Meanwhile, the image-stabilizing optical system of the type in which a part of the photographic lens system is shifted in parallel in a direction perpendicular to the optical axis, though having an advantage that there is no need of a special optical system for image stabilization, has a problem that at the time of the image stabilizing operation, a large amount of decentering aberrations is produced.

Again, in order to assure a necessary amount of light on the image plane at the time of the image stabilizing operation, those of the lens units which lie on the object side of the movable lens unit are required to increase their diameters. For this reason, there is a problem that the whole instrument gets a large size.

Further, in the image-stabilizing optical system of the type in which the image stabilizing operation is effected by tilting at least one lens unit behind the variable magnification lens units (zoom section), the relationship between the amount of correction for the image shake and the amount of movement of the movable lens unit varies with variation of the zooming position in a complicated manner. To evaluate these amounts, a computing circuit or like means becomes necessary. So, there is a problem that the whole instrument gets an increased complexity of structure, and a large increase of the production cost results.

In another case where the variator or another lens unit movable for zooming is used in stabilizing the image, a problem arises in that an operating mechanism becomes very complicated, and the load on a driving means for those lens units, namely, a zoom motor, increases largely.

Further, in the proposal of Japanese Laid-Open Patent Application No. Hei 2-238429 and U.S. Pat. No. 2,959,088 mentioned before, use is made of a negative first lens unit and a positive second lens unit as arranged in front of the photographic system, wherein the second lens unit is supported by a gimbal. Such an image-stabilizing optical system employing the principle of inertial pendulum has a characteristic feature that even if the vibrations have a high frequency, the image stabilizing function works considerably better than with the before-described active type of image-stabilizing optical systems.

Because the lens units which are effective only for image stabilization are positioned in front of the photographic system, and because one of these lens units is made to oscillate so as to correct the image shake so that a stationary image is obtained, there is, however, a problem that the whole lens system is required to have a large size.

Meanwhile, in order to prevent the optical performance from decreasing at the time of the image stabilizing operation, part of the photographic system, or a lens member, may be shifted in parallel in a direction perpendicular to the optical axis. When large angles of correction are required in such an image-stabilizing optical system, it is very difficult to sufficiently correct the decentering aberrations at the time of the image stabilizing operation. Further, in an optical system using the variable angle prism, there is a problem that large decentering lateral chromatic aberration is produced at the time of the image stabilizing operation.

SUMMARY OF THE INVENTION

An object of the invention is to provide a variable magnification lens system capable of image stabilization, while still permitting improvements of the image quality and a reduction of the size of the system to be achieved.

A lens unit constituting part of a variable magnification optical system is made to tilt with its tilting center at a point on an optical axis so that as the optical system vibrates, the shaking of the image is corrected, thereby minimizing the size of the entire system, and, at the same time, maintaining at a minimum the amount of decentering aberrations produced by tilting the lens unit. It is, therefore, a second object of the invention to provide a variable magnification optical system having an image stabilizing function with good correction of decentering aberrations.

Meanwhile, in the image-stabilizing optical system of the active type in which either a certain lens unit is decentered by using driving means such as actuator, or the apex angle of the variable angle prism is varied, to deflect a photographed image so that a stationary image is obtained, when vibrations have as high a frequency as more than several tens of Hz, the characteristic of, for example, a control system and the frequency response characteristic of the sensor cannot follow up the variations. Such a situation is sometimes encountered, where it is very difficult to correct the image shake.

In application to the type where a certain lens unit is spatially fixed by an automatic holding means such as pendulum, it is, therefore, a third object of the invention to prevent the image stabilizing effect from being diminished due to the characteristic of the control system and the frequency response characteristic.

In application to another type of variable magnification optical system wherein a zoom section is preceded toward the object side by a first lens unit which remains stationary during zooming and focusing, and the first lens unit is made to tilt with its tilting center at a point on the optical axis almost its focal length distant from its rear principal point toward the image side, and is thus spatially fixed against vibrations of the variable magnification optical system to correct the shaking of a photographed image as the variable magnification optical system vibrates, it is a fourth object of the invention to make use of at least one of the lens units disposed on the image side of the zoom section for the purpose of focusing on an object at a finite distance by axially moving the at least one lens unit.

A variable magnification optical system of the invention functions to stabilize the image. For this purpose, the optical system is provided with a first lens unit which remains stationary during zooming and focusing on the object side of a zooming section. This first lens unit comprises a fixed front lens sub-unit and a rear lens sub-unit which is made to tilt with its tilting center at a point on the optical axis to correct an image shake. At least one lens surface in the front lens sub-unit is formed to such an aspheric shape that a positive refractive power gets stronger from a central portion thereof toward a marginal portion thereof. Letting the focal length of the rear lens sub-unit be denoted by f1b, the distance from a rear principal point of the rear lens sub-unit to the tilting center by L, and the longest focal length of the entire lens system by fT, the following conditions are satisfied:

$$0.5 < |f1b/L| < 1.2 \qquad (1)$$

$$0.53 < |f1b/fT| < 0.65 \qquad (2)$$

In a specific embodiment, the aforesaid variable magnification optical system comprises, from front to rear, a first lens unit of positive refractive power which is stationary during zooming and focusing, a second lens unit of negative refractive power having the function of varying the magnification, a fixed third lens unit of positive refractive power, and a fourth lens unit of positive refractive power having both of the function of compensating for the image shift with variation of the magnification and the focusing function.

DETAILED DESCRIPTION OF THE PREFERRED EMBODIMENTS

Figure 1:
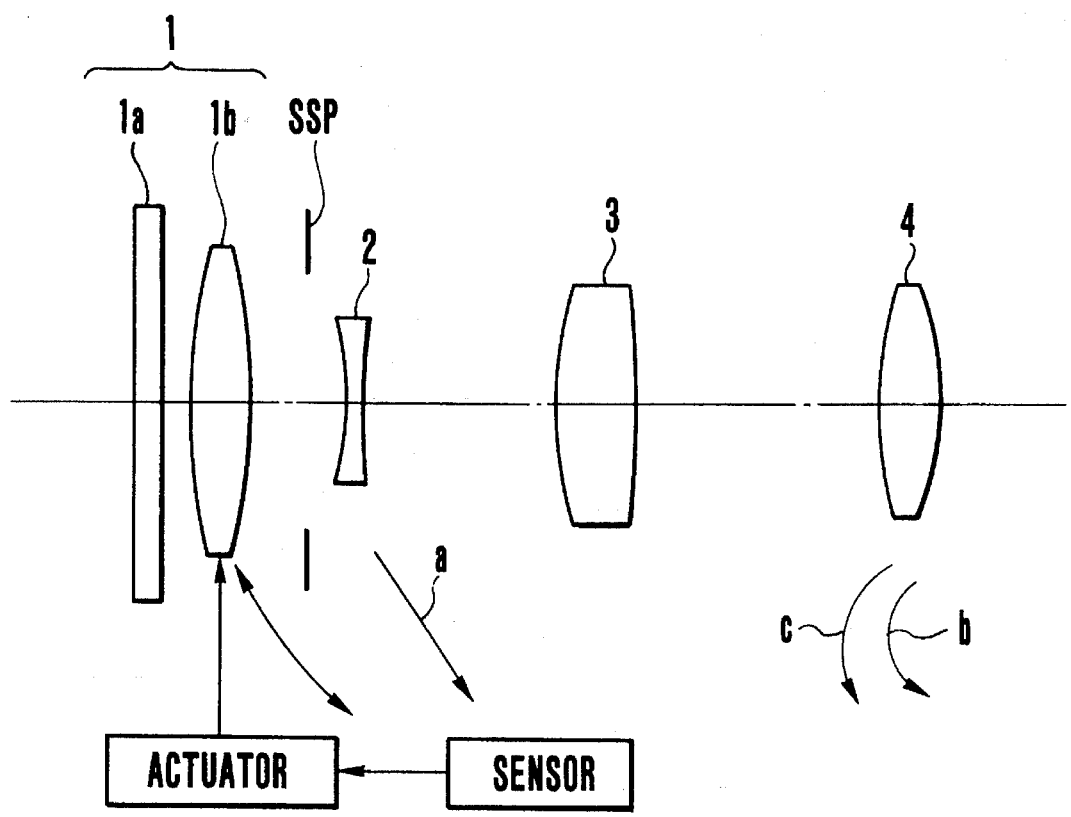
FIG. 1 is a diagram showing the paraxial refractive powers of an optical system according to an embodiment of the invention.
Figure 2:
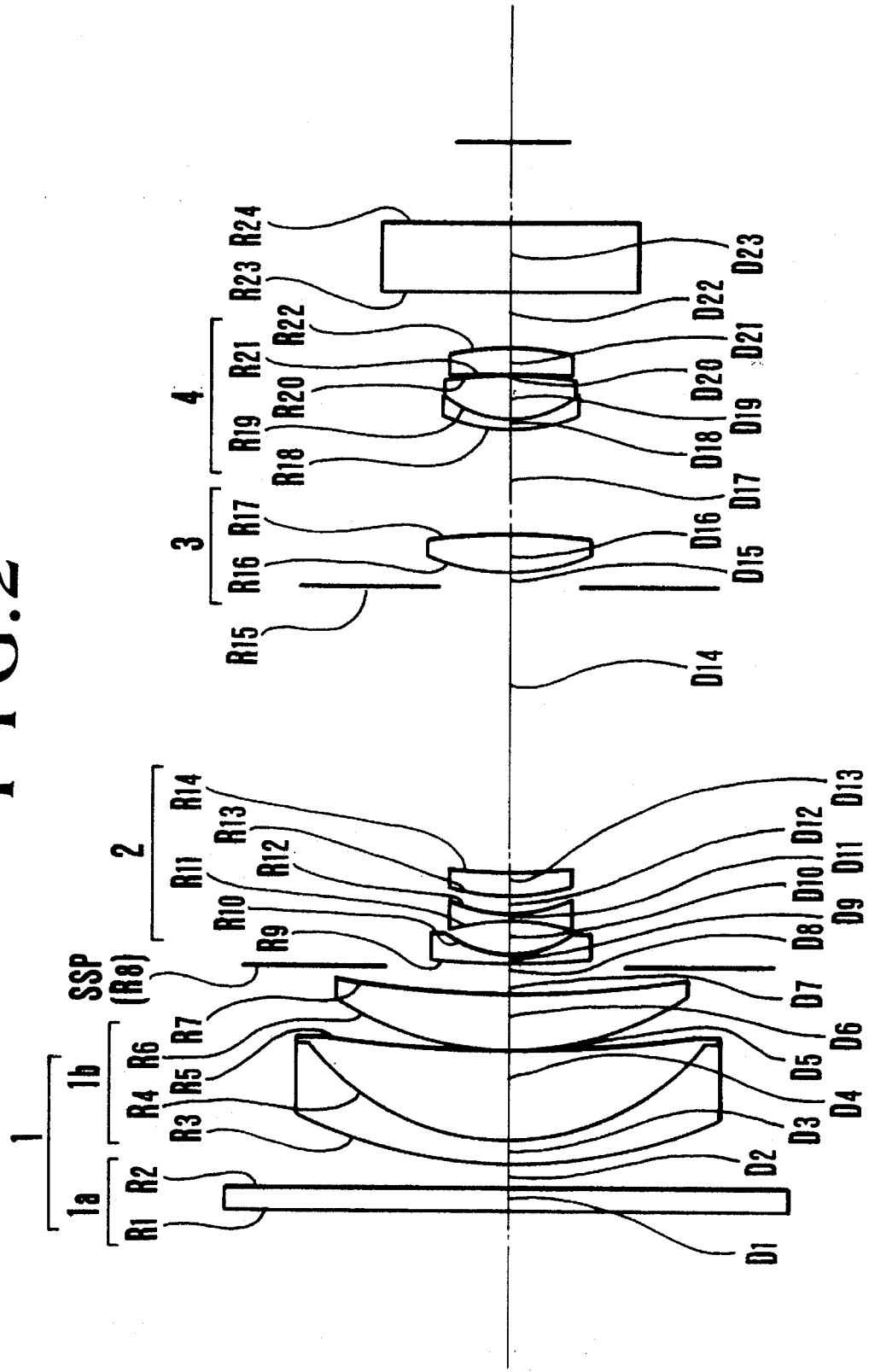
FIG. 2 is a lens block diagram of a numerical example 1 of the invention.
Figure 3:
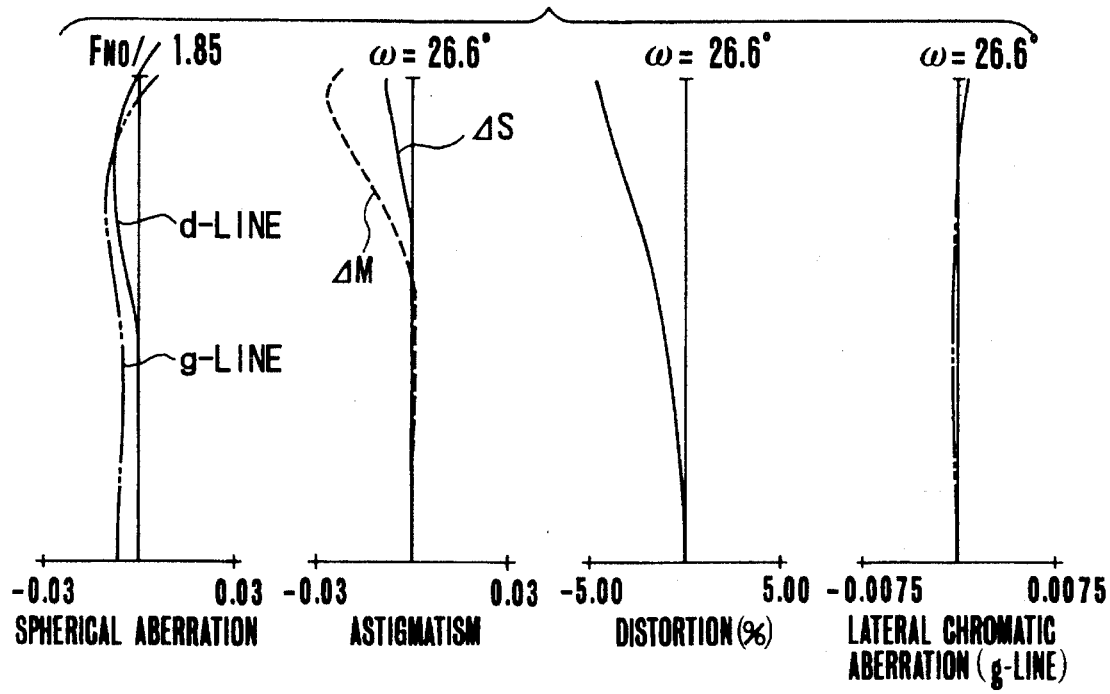
FIG. 3 shows graphic representations of the various aberrations of the numerical example 1 in the wide-angle end.
Figure 4:
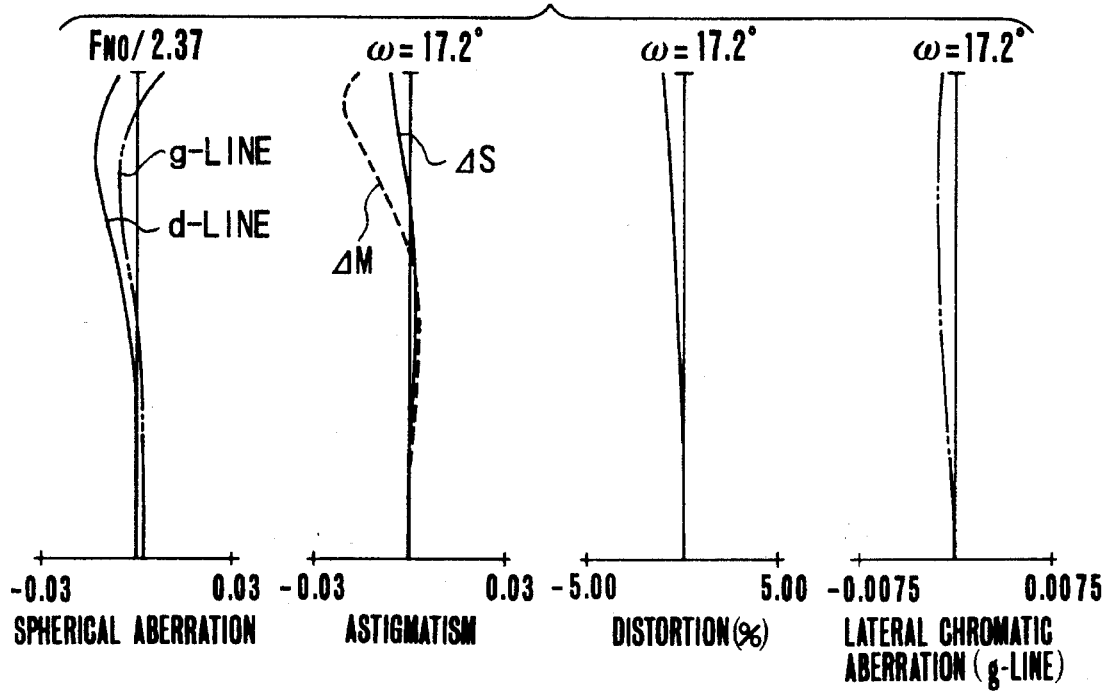
FIG. 4 shows graphic representations of the various aberrations of the numerical example 1 in an intermediate position.
Figure 5:
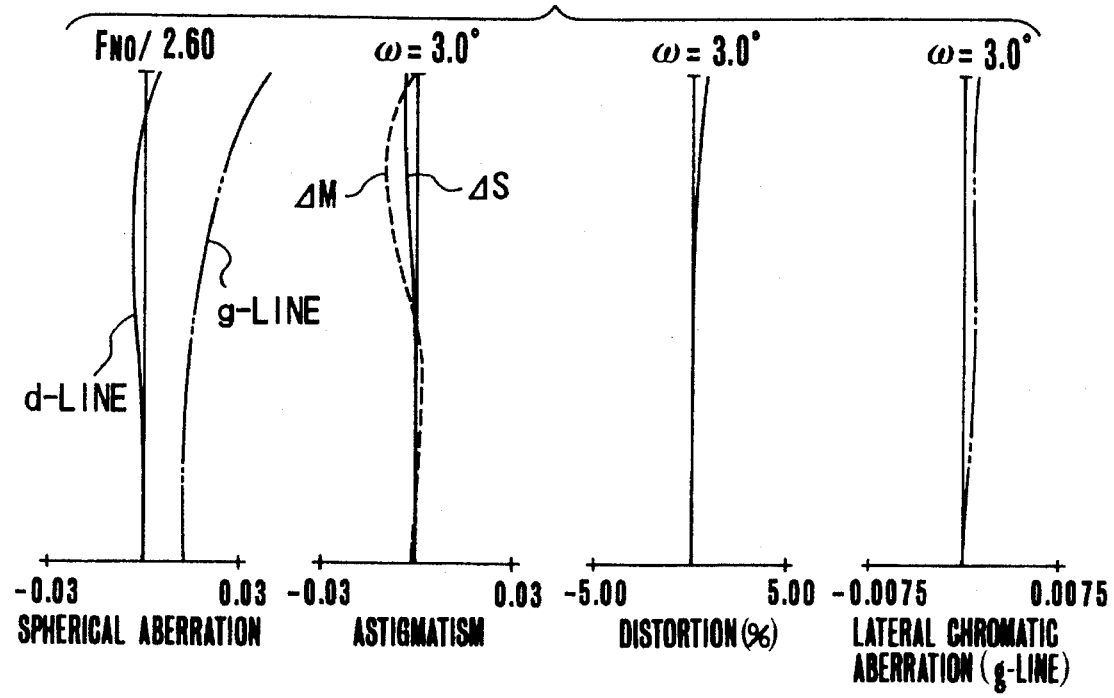
FIG. 5 shows graphic representations of the various aberrations of the numerical example 1 in the telephoto end.
Figure 6:
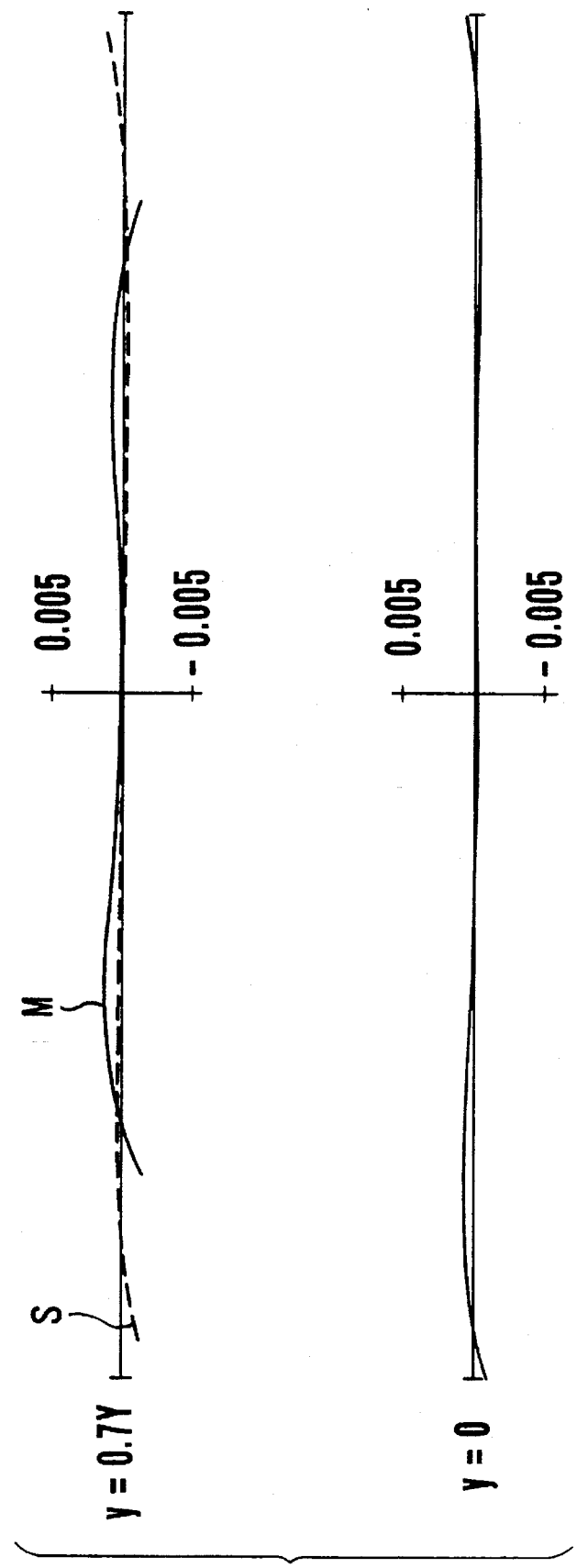
FIG. 6 shows the lateral aberrations of the numerical example 1 in the telephoto end when not decentered.
Figure 7:
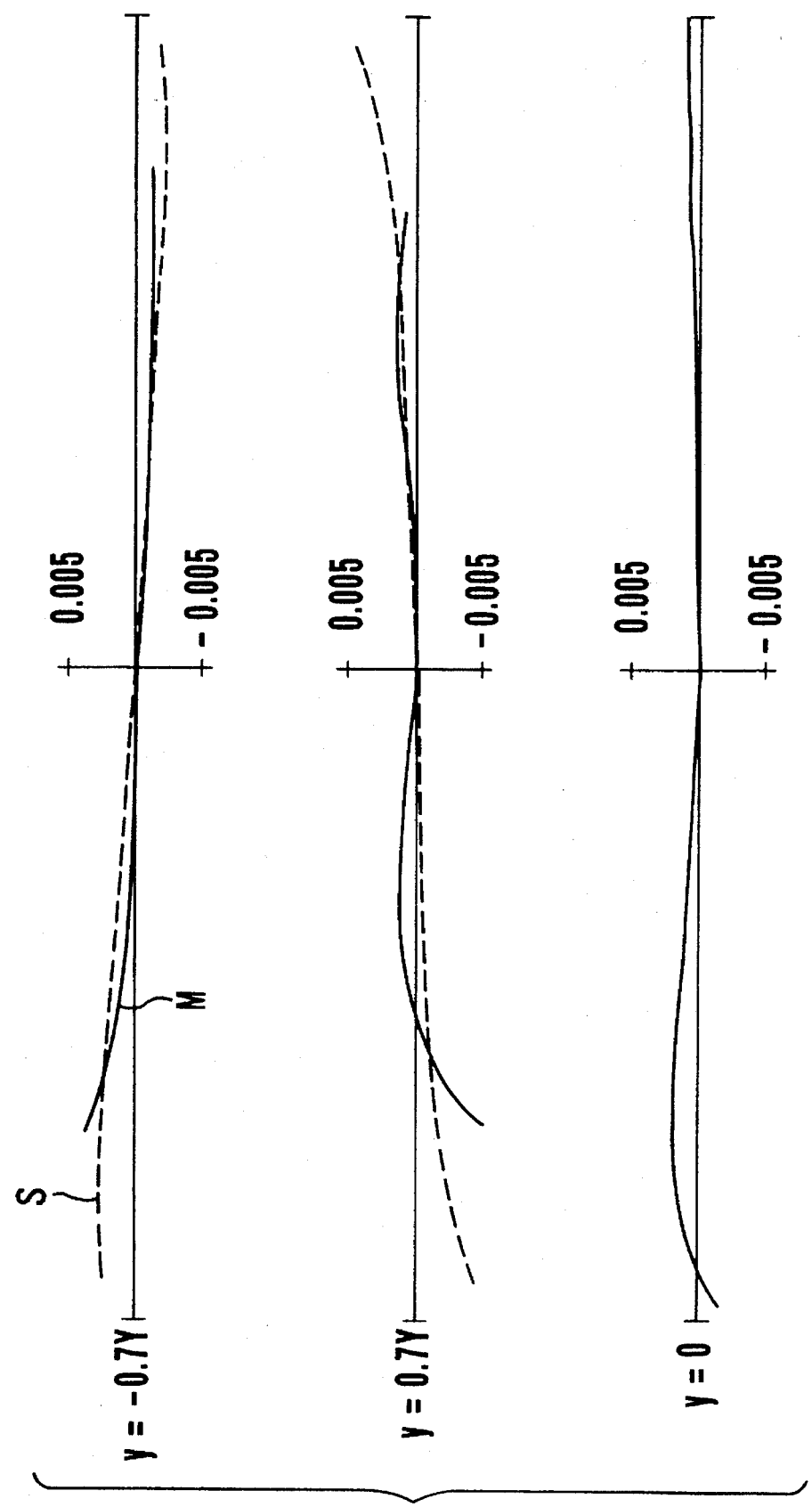
FIG. 7 shows the lateral aberrations of the numerical example 1 in the telephoto end with the shake angle of 2 degrees corrected.
Figure 8:
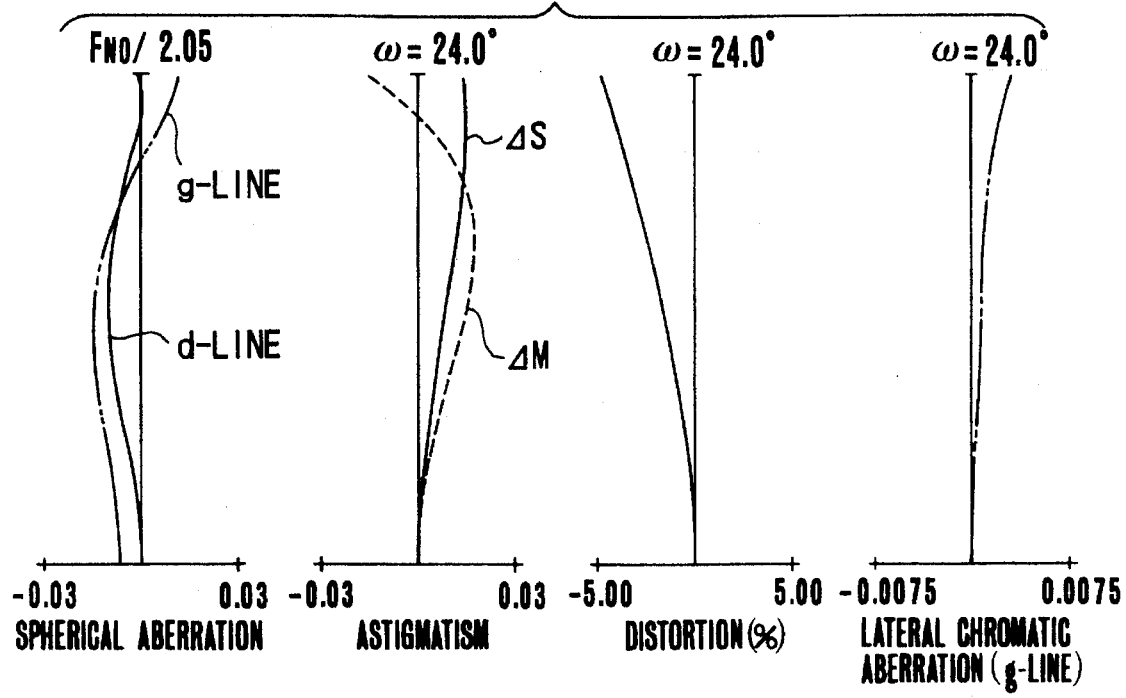
FIG. 8 shows graphic representations of the various aberrations of a numerical example 2 of the invention in the wide-angle end.
Figure 9:
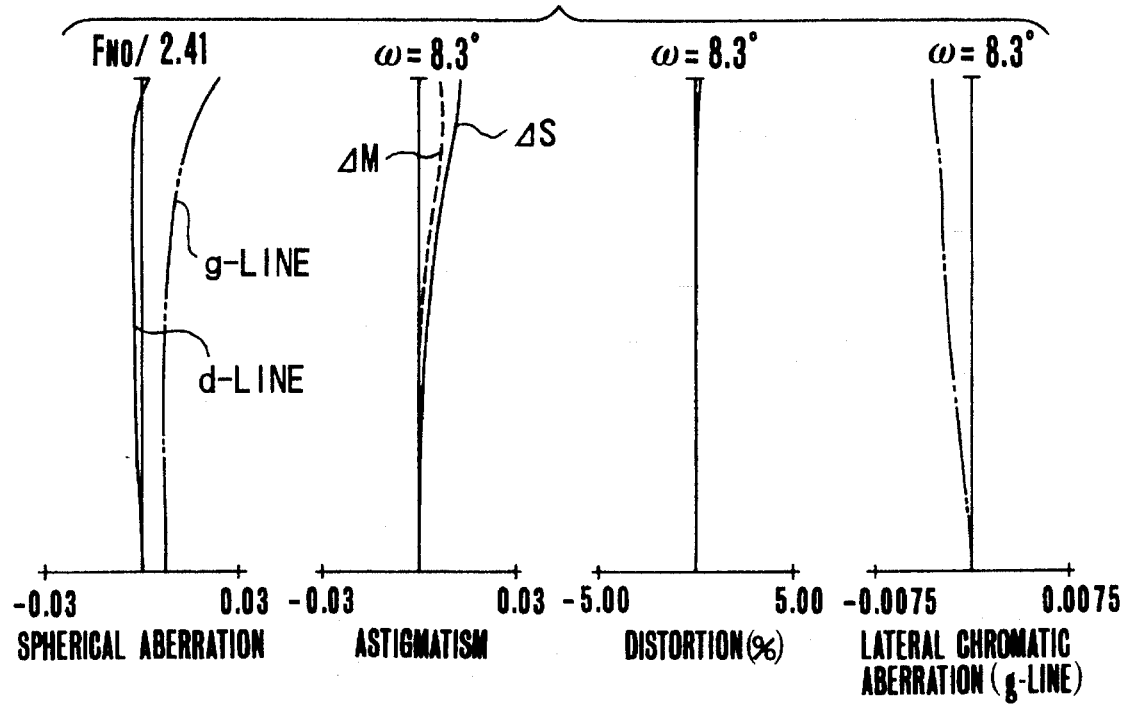
FIG. 9 shows graphic representations of the various aberrations of the numerical example 2 in an intermediate position.
Figure 10:
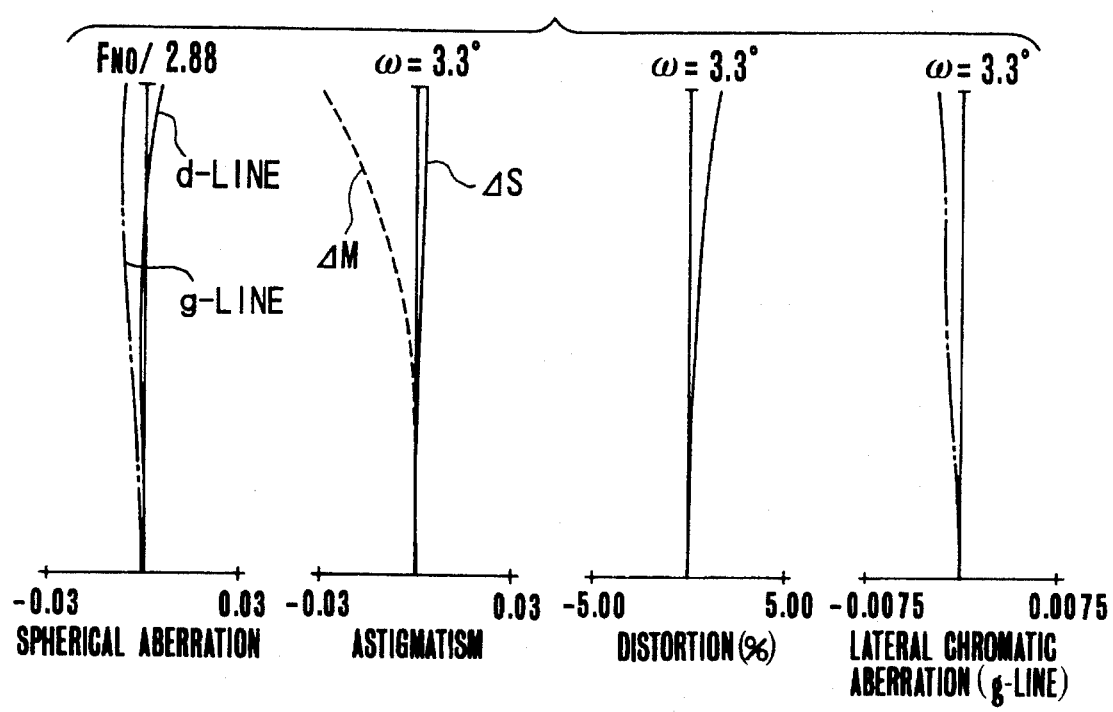
FIG. 10 shows graphic representations of the various aberrations of the numerical example 2 in the telephoto end.
Figure 11:
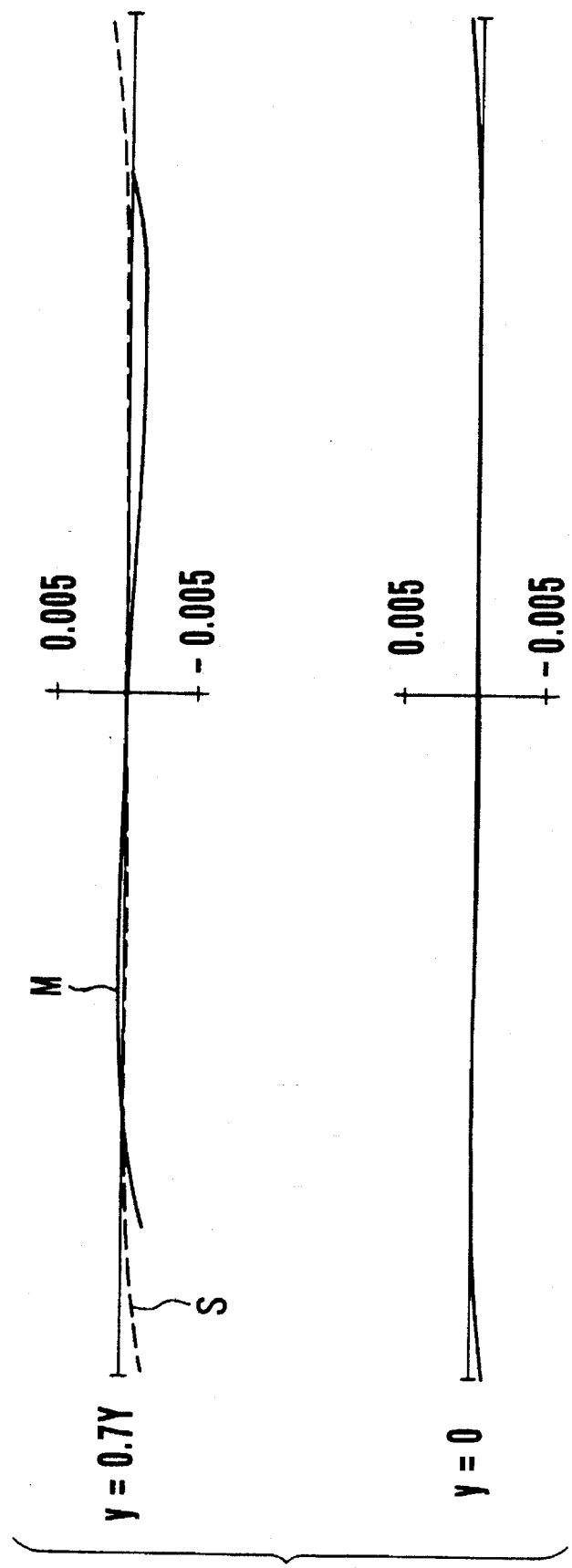
FIG. 11 shows the lateral aberrations of the numerical example 2 in the telephoto end when not decentered.
Figure 12:
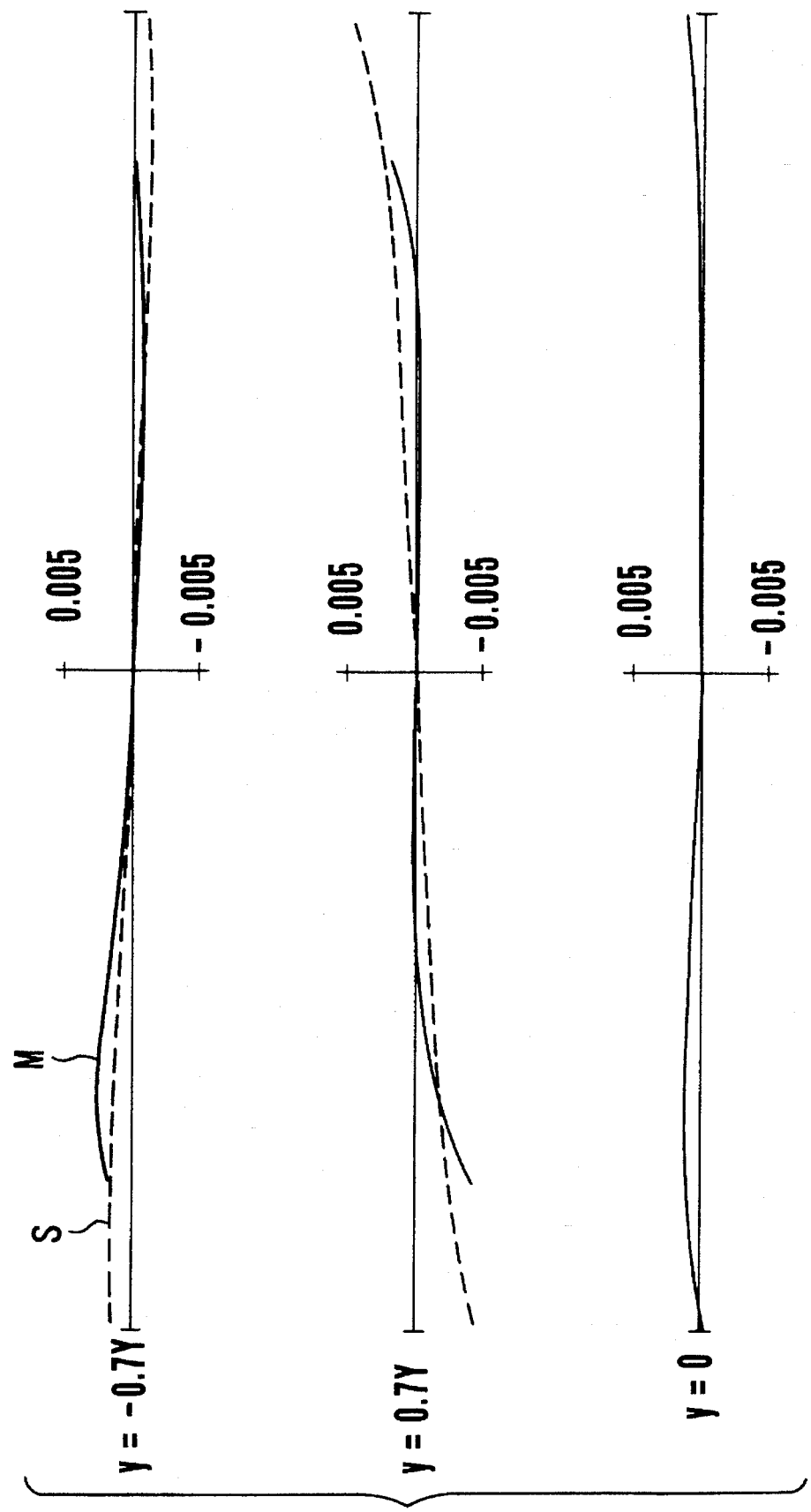
FIG. 12 shows the lateral aberrations of the numerical example 2 in the telephoto end with the shake angle of 2 degrees corrected.
Figure 13:
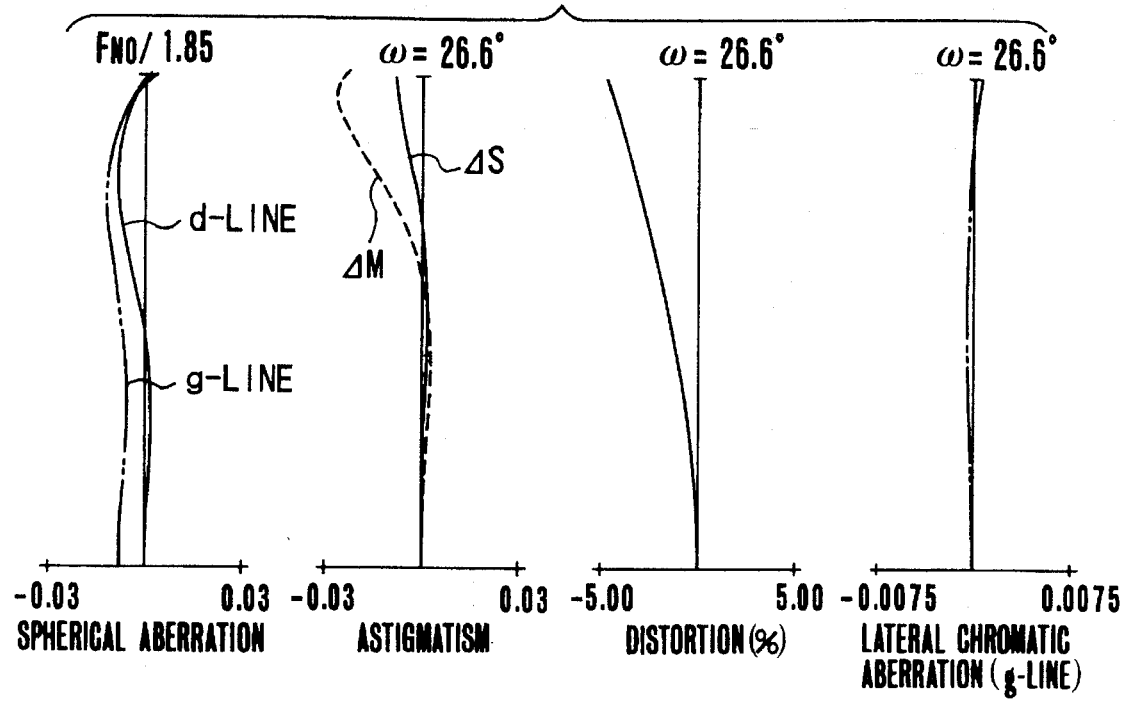
FIG. 13 shows graphic representations of the numerical example 3 of the invention in the wide-angle end.
Figure 14:
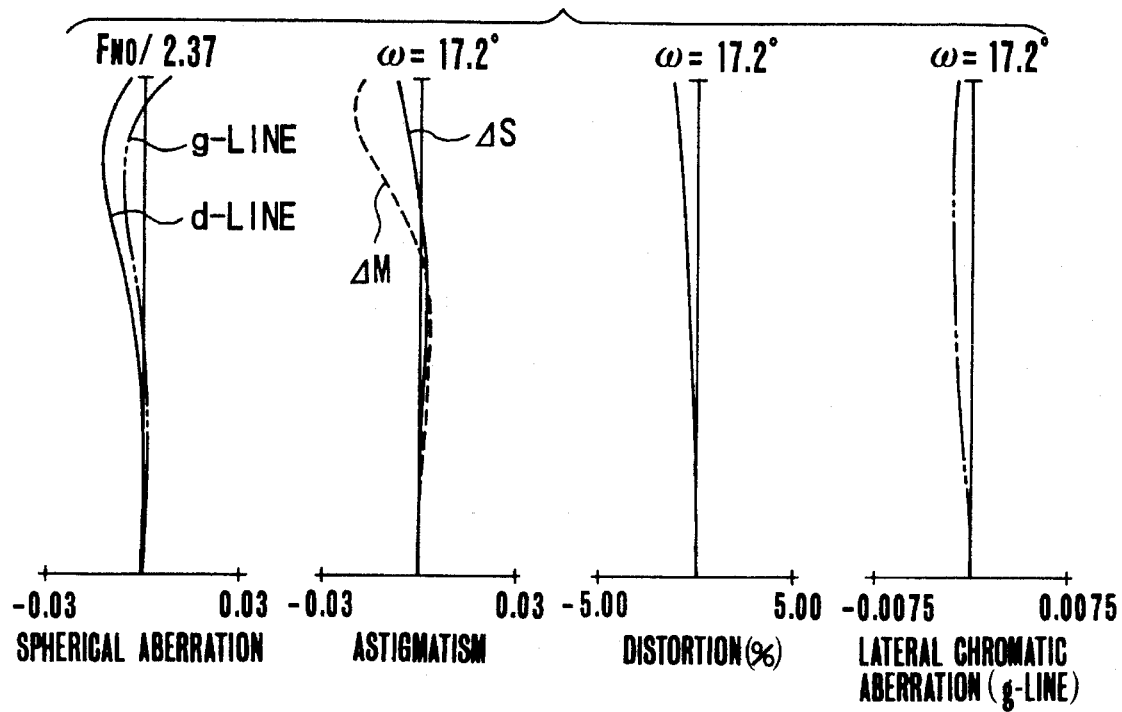
FIG. 14 shows graphic representations of the various aberrations of the numerical example 3 in an intermediate position.
Figure 15:
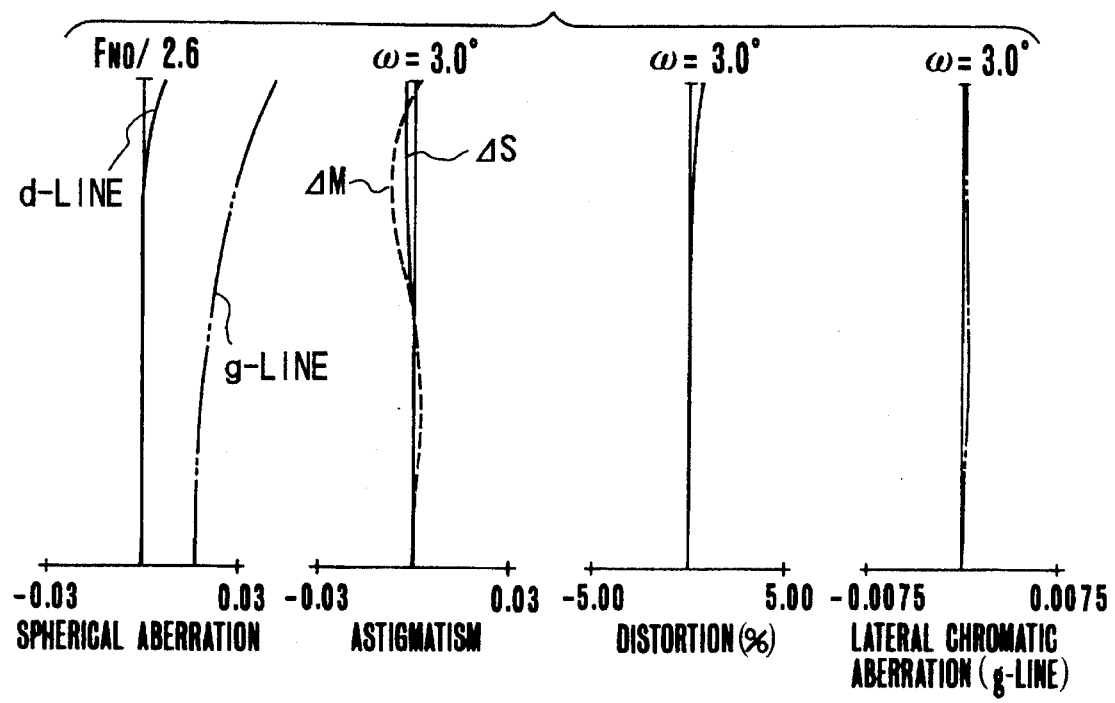
FIG. 15 shows graphic representations of the various aberrations of the numerical example 3 in the telephoto end.
Figure 16:
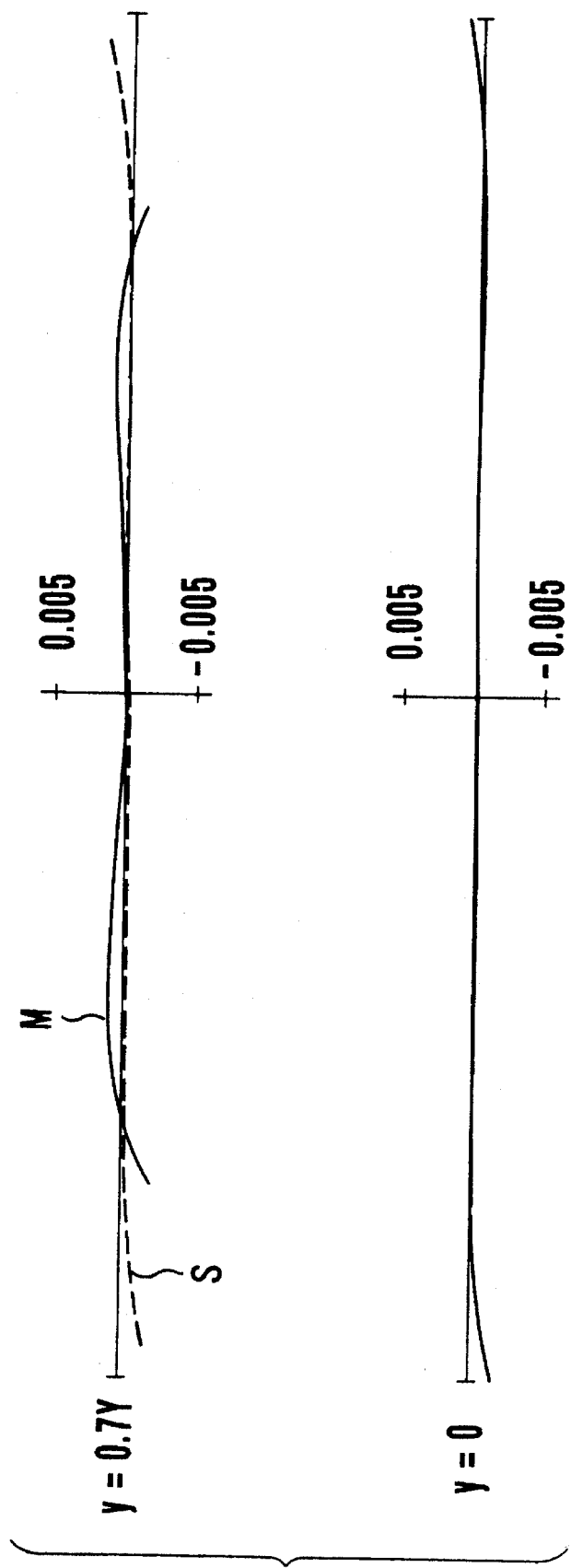
FIG. 16 shows the lateral aberrations of the numerical example 3 in the telephoto end when not decentered.
Figure 17:
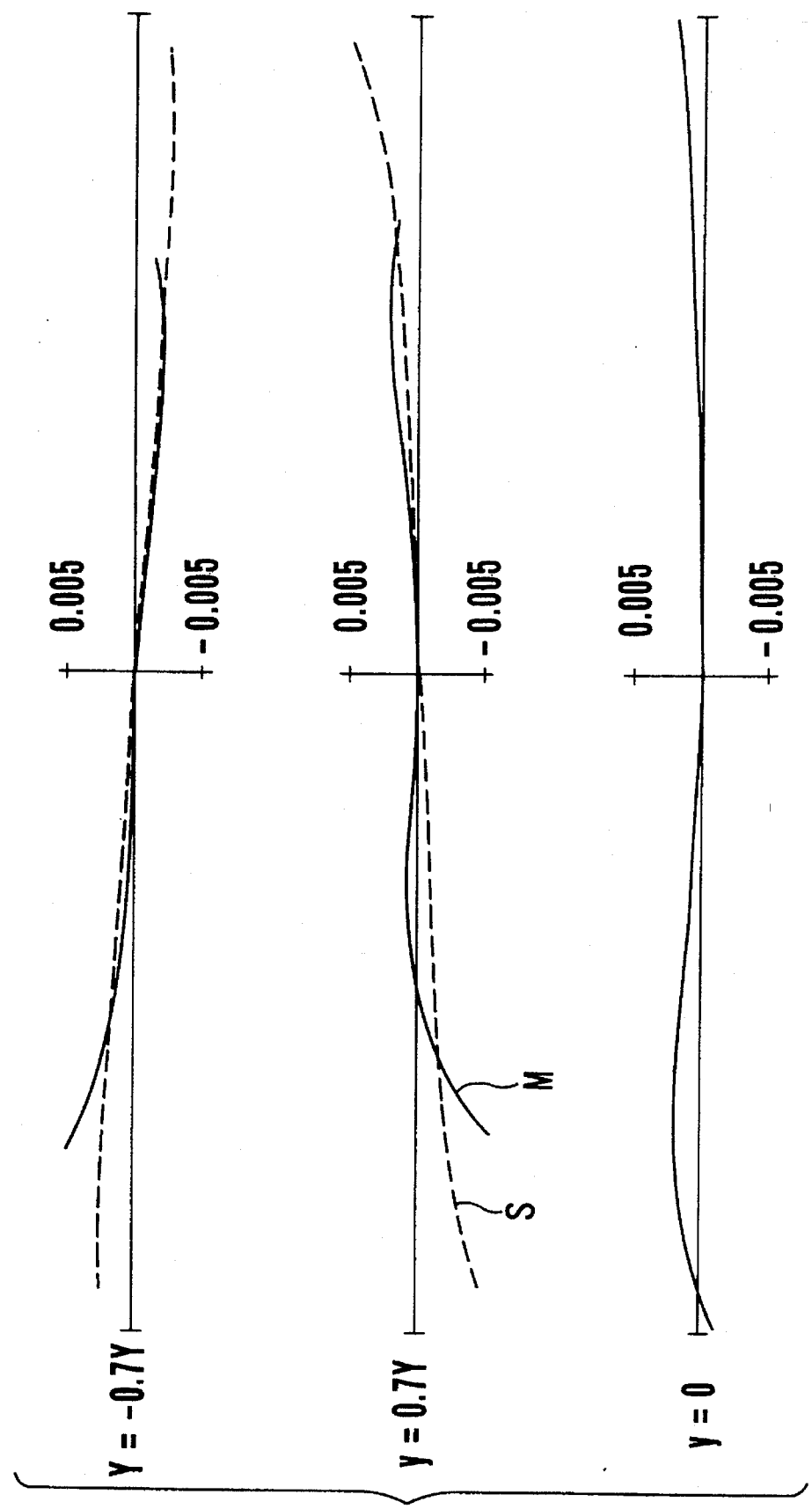
FIG. 17 shows the lateral aberrations of the numerical example 3 in the telephoto end with the shake angle of 2 degrees corrected.

FIG. 1 shows the paraxial refractive power arrangement of the optical system according to an embodiment of the invention, and FIG. 2 is a lens block diagram of the numerical example 1 of the invention.

In the drawings, a first lens unit 1, which remains stationary during zooming and focusing, is constructed from two lens sub-units, of which the front lens sub-unit 1a is fixed and the rear lens sub-unit 1b (movable lens unit) for image stabilization is made to tilt with its tilting center at a point on an optical axis to correct the image shake. The rear surface of the front lens sub-unit 1a is formed to such an aspheric shape that a positive refractive power gets progressively stronger from a central portion thereof toward a marginal portion thereof. It is to be noted that, in the front lens sub-unit, its power in this embodiment is almost zero.

A second lens unit 2 of negative refractive power moves along the optical axis when varying the magnification, constituting a magnification varying portion. The second lens unit 2 is made to move as, for example, shown by an arrow "a" to vary the magnification from the wide-angle end to the telephoto end.

A third lens unit 3 of positive refractive power is fixed. A fourth lens unit 4 of positive refractive power has both the function of compensating for the axial shift of an image plane with variation of the magnification and the function of focusing.

In the present embodiment, with an infinitely distant object in an in-focus state, when the magnification is varied from the wide-angle end to the telephoto end, the fourth lens unit 4 is moved axially as shown by a curve "b". Also, with an object at a minimum distance in an in-focus state, when the magnification is varied from the wide-angle end to the telephoto end, the fourth lens unit 4 is moved axially as shown by a curve "c".

In the present embodiment, the first lens unit 1 is constructed from the two lens sub-units 1a and 1b. Of these, the rear lens sub-unit 1b is used for image stabilization. As the variable magnification optical system vibrates, a sensor detects an angle of inclination. A predetermined transformation is then applied to it to obtain an amount of correction, based on which the rear lens sub-unit 1b is tilted about a certain point on the optical axis by an actuator. Thus, the image shake is corrected. It is to be understood that, in view of the prior known image-stabilizing optical system, there is no need to newly employ an additional optical member such as a lens unit only for image stabilization, or a variable angle prism, when the image stabilizing function is imparted to the optical system.

To correct the decentering aberrations produced by the tilting of the rear lens sub-unit, the front lens sub-unit 1a is provided on the object side of the rear lens sub-unit. Of the decentering aberrations caused by the image stabilizing operation, the decentering coma and the decentering field curvature are particularly corrected well.

In the present embodiment, the first lens unit 1 constituting part of the variable magnification optical system is designed itself as a block. This enables the first lens unit 1 to be made achromatic to some extent by itself. So, the image stabilizing operation can be carried out with production of less decentering lateral chromatic aberration than when the variable angle prism is used in the prior art.

In the embodiment of the invention, such four lens units 1 to 4 suffice for realizing a variable magnification optical system having the image stabilizing function.

Another feature is that the size of the whole lens system is minimized in such a manner as to obtain good optical performance by setting forth the above-described conditions (1) and (2).

Next, the technical significance of each of the conditions (1) and (2) is explained.

The inequalities of condition (1) give an appropriate position to the center on the optical axis of tilting of the rear lens sub-unit. When the condition (1) is satisfied, the image stabilizing function works effectively.

When the lower limit of the condition (1) is exceeded, as this implies that the center of tilting is too far away from the rear principal point of the rear lens sub-unit, insufficient correction of the decentering field curvature caused by the image stabilizing operation results. So, it is not desirable.

As the center of tilting comes closer to the rear principal point of the rear lens sub-unit than the upper limit of the condition (1), over-corrected decentering field curvature is produced when the image stabilizing operation is carried out. Also, the amount of decentering coma produced, too, becomes objectionably large.

The inequalities of condition (2) give a proper range for the refractive power of the rear lens sub-unit 1b and have an aim chiefly to reduce the amount of decentering aberrations produced when the rear lens sub-unit 1b is decentered to stabilize the image.

When the lower limit of the condition (2) is exceeded, as this means that the refractive power of the rear lens sub-unit 1b is too strong, it becomes difficult to suppress the produced amount of decentering aberrations to a minimum.

Conversely, when the upper limit of the condition (2) is exceeded, as this means that the refractive power of the rear lens sub-unit 1b is too weak, the amount of decentering of the rear lens sub-unit 1b at the time of the image stabilizing operation becomes large. So, too large a distance from the center of the area of the decentered rear lens sub-unit 1b to the optical axis results. To compensate for this, the diameter of the rear lens sub-unit 1b has to be increased objectionably.

In the embodiment of the invention, on the object side of the rear lens sub-unit 1b for image stabilization, there is provided the front lens sub-unit 1a which is fixed. The front lens sub-unit 1a has its rear surface formed to such an aspheric shape that a positive refractive power gets progressively stronger from a central portion thereof to a marginal portion thereof.

In this instance, the aspheric quantity of the above-mentioned lens surface increases as the angle of inclination of the rear lens sub-unit 1b equivalent to the angle of correction increases, in other words, as, at the time of tilting, the tilting center of the rear lens sub-unit 1b approaches the front lens sub-unit 1a. The decentering aberrations, particularly, decentering coma, caused by the image stabilizing operation are, therefore, corrected well for maintaining a high optical performance.

This fixed front lens sub-unit 1a also serves as a protection glass so as not to allow any other forces than that for the image stabilization to directly access the variable magnification optical system from the outside.

A fixed stop SSP is arranged in between the first lens unit 1 and the second lens unit 2 to minimize the variation of the ratio of illumination on the image plane of the marginal zone to the central zone at the time of the image stabilizing operation. Thus, it is possible to obtain a proper light intensity distribution over the entire area of the image frame at the time of the image stabilizing operation.

Next, specific examples 1 to 3 of the invention are shown. In the numerical data for the examples 1 to 3, Ri is the radius of curvature of the i-th lens surface, when counted from the object side, Di is the i-th lens thickness or air separation, and Ni and vi are respectively the refractive index and Abbe number of the glass of the i-th lens element. The values of the factors in the conditions (1) and (2) for the numerical examples 1 to 3 are listed in Table-1.

Incidentally, R23 and R24 in the numerical examples 1 and 3, or R21 and R22 in the numerical example 2 define a glass member (parallel flat plate) such as a face plate.

In the numerical examples 1 to 3, R1 and R2 denote the front lens sub-unit having the function of correcting the decentering aberrations at the time of the image stabilizing operation, and R8 denotes the fixed stop SSP for preventing variation of the illumination ratio on the image plane at the time of the image stabilizing operation.

The shape of the aspheric surface is expressed in the coordinates with an X axis in the axial direction and an h axis in the direction perpendicular to the optical axis, the direction in which light advances being taken as positive, by the following equation:

$$X = \frac{h^2/R}{1 + \sqrt{1 - (1+k)(h/R)^2}} + Bh^4 + Ch^6 + Dh^8 + Eh^{10}$$

where $R_0$ is the radius of the osculating sphere, and B, C, D and E are the aspheric coefficients.

Also, "D-0x" for example, signifies "$\times 10^{-x}$".

Numerical Example 1:
F = 1–9.46   FNO = 1:1.85–2.60   2ω = 53.2°–6.1°

| | | | |
|---|---|---|---|
| R1 = ∞ | D1 = 0.2659 | N1 = 1.58313 | v1 = 59.4 |
| R2 = Aspherical | D2 = 0.31 | | |
| R3 = 5.9024 | D3 = 0.2347 | N2 = 1.80518 | v2 = 25.4 |
| R4 = 3.0011 | D4 = 1.0169 | N3 = 1.62280 | v3 = 57.1 |
| R5 = 19.0117 | D5 = 0.0313 | | |
| R6 = 3.8646 | D6 = 0.5632 | N4 = 1.77250 | v4 = 49.6 |
| R7 = 12.5153 | D7 = 0.29 | | |
| R8 = Fixed Stop | D8 = Variable | | |
| R9 = 10.3513 | D9 = 0.1095 | N5 = 1.77250 | v5 = 49.6 |
| R10 = 1.1593 | D10 = 0.3700 | | |
| R11 = –2.7567 | D11 = 0.1095 | N6 = 1.69680 | v6 = 55.5 |
| R12 = 1.5665 | D12 = 0.1721 | | |
| R13 = 1.9293 | D13 = 0.2659 | N7 = 1.84666 | v7 = 23.8 |
| R14 = 8.9728 | D14 = Variable | | |
| R15 = Aperture Stop | D15 = 0.1721 | | |
| R16 = 2.3868 | D16 = 0.4380 | N8 = 1.58313 | v8 = 59.4 |
| R17 = Aspherical | D17 = Variable | | |
| R18 = 2.4818 | D18 = 0.0939 | N9 = 1.84666 | v9 = 23.8 |
| R19 = 1.2043 | D19 = 0.4693 | N10 = 1.51633 | v10 = 64.2 |
| R20 = –10.0064 | D20 = 0.0235 | | |
| R21 = –55.3935 | D21 = 0.2659 | N11 = 1.60311 | v11 = 60.7 |
| R22 = –3.7088 | D22 = 0.6258 | | |
| R23 = ∞ | D23 = 0.7822 | N12 = 1.51633 | v12 = 64.2 |
| R24 = ∞ | | | |

R2: Aspheric Surface
$R_0 = \infty$   K = 0   B = –1.56712D – 04

R17: Aspheric Surface
$R_0 = -7.6694$   K = 3.25725D + 00
B = –5.52222D – 02   C = –4.06010D – 03
D = –1.53076D – 02   E = –6.58462D – 03

| Variable | Focal Length | | |
|---|---|---|---|
| Separation | 1.00 | 3.92 | 9.46 |
| D8 | 0.06 | 2.08 | 2.95 |
| D14 | 3.14 | 1.12 | 0.25 |
| D17 | 1.21 | 0.51 | 1.24 |

Tilting Center at a distance of 6.629 from the lens surface R3.

Numerical Example 2:
F = 1–7.60   FNO = 1:2.05–2.882   2ω = 48.0°–6.6°

| | | | |
|---|---|---|---|
| R1 = ∞ | D1 = 0.2083 | N1 = 1.51633 | v1 = 64.2 |
| R2 = Aspherical | D2 = 0.28 | | |
| R3 = 8.6537 | D3 = 0.1528 | N2 = 1.80518 | v2 = 25.4 |
| R4 = 2.6736 | D4 = 0.6945 | N3 = 1.62299 | v3 = 58.2 |
| R5 = –50.9433 | D5 = 0.0278 | | |
| R6 = 2.9458 | D6 = 0.4167 | N4 = 1.80610 | v4 = 41.0 |
| R7 = 9.7227 | D7 = 0.22 | | |
| R8 = Fixed Stop | D8 = Variable | | |
| R9 = 29.9682 | D9 = 0.0694 | N5 = 1.88300 | v5 = 40.8 |
| R10 = 0.8233 | D10 = 0.3123 | | |
| R11 = –0.9646 | D11 = 0.0694 | N6 = 1.58144 | v6 = 40.8 |
| R12 = 1.3462 | D12 = 0.2778 | N7 = 1.84666 | v7 = 23.8 |
| R13 = –2.5971 | D13 = Variable | | |
| R14 = Aperture Stop | D14 = 0.1667 | | |
| R15 = Aspherical | D15 = 0.4167 | N8 = 1.58313 | v8 = 59.4 |
| R16 = –11.4523 | D16 = Variable | | |
| R17 = 2.8775 | D17 = 0.0694 | N9 = 1.84666 | v9 = 23.8 |
| R18 = 1.1272 | D18 = 0.0347 | | |
| R19 = 1.2844 | D19 = 0.5278 | N10 = 1.58313 | v10 = 59.4 |
| R20 = Aspherical | D20 = 1.1112 | | |
| R21 = ∞ | D21 = 0.7778 | N11 = 1.51633 | v11 = 64.2 |
| R22 = ∞ | | | |

R2: Aspheric Surface
$R_0 = \infty$   K = 0   B = –5.59792D – 04

R15: Aspheric Surface
$R_0 = 1.8533$   K = –7.87402D – 02
B = –2.81506D – 02   C = –2.77357D – 02
D = 1.40493D – 02

-continued

R20: Aspheric Surface
$R_0 = -2.3519$        $K = 0$       $B = 5.22976D - 04$
$C = -5.07458D - 02$                 $D = -2.86992D - 02$

| Variable | Focal Length | | |
|---|---|---|---|
| Separation | 1.00 | 1.80 | 7.60 |
| D8 | 0.09 | 0.95 | 2.42 |
| D13 | 2.74 | 1.60 | 0.13 |
| D16 | 0.99 | 0.59 | 0.98 |

Tilting Center at a distance of 5.242 from the lens surface R3.

Numerical Example 3:
$F = 1–9.46$  $FNO = 1:1.85–2.60$  $2\omega = 53.2°–6.1°$

| | | | |
|---|---|---|---|
| R1 = ∞ | D1 = 0.2659 | N1 = 1.58313 | v1 = 59.4 |
| R2 = Aspherical | D2 = 0.31 | | |
| R3 = 6.0147 | D3 = 0.2347 | N2 = 1.80518 | v2 = 25.4 |
| R4 = 3.0324 | D4 = 1.0168 | N3 = 1.62299 | v3 = 58.2 |
| R5 = 19.2651 | D5 = 0.0313 | | |
| R6 = 3.8372 | D6 = 0.5632 | N4 = 1.77250 | v4 = 49.6 |
| R7 = 12.5147 | D7 = 0.30 | | |
| R8 = Fixed Stop | D8 = Variable | | |
| R9 = 10.0075 | D9 = 0.1095 | N5 = 1.77250 | v5 = 49.6 |
| R10 = 1.1435 | D10 = 0.3690 | | |
| R11 = –2.7546 | D11 = 0.1095 | N6 = 1.69680 | v6 = 55.5 |
| R12 = 1.5688 | D12 = 0.1721 | | |
| R13 = 1.9369 | D13 = 0.2659 | N7 = 1.84666 | v7 = 23.8 |
| R14 = 9.5147 | D14 = Variable | | |
| R15 = Aperture Stop | D15 = 0.1721 | | |
| R16 = Aspherical | D16 = 0.4380 | N8 = 1.58313 | v8 = 59.4 |
| R17 = –7.7627 | D17 = Variable | | |
| R18 = 2.3759 | D18 = 0.0939 | N9 = 1.84666 | v9 = 23.8 |
| R19 = 1.1838 | D19 = 0.4693 | N10 = 1.51633 | v10 = 64.2 |
| R20 = –16.2041 | D20 = 0.0235 | | |
| R21 = –208.7752 | D21 = 0.2659 | N11 = 1.60311 | v11 = 60.7 |
| R22 = –3.6652 | D22 = 0.6257 | | |
| R23 = ∞ | D23 = 0.7822 | N12 = 1.51633 | v12 = 64.2 |
| R24 = ∞ | | | |

R2: Aspheric Surface
$R_0 = \infty$          $K = 0$       $B = -1.30610D - 04$
R16: Aspheric Surface
$R_0 = 2.3914$                        $K = 3.28859D + 00$
$B = -5.49762D - 02$                  $C = -3.59539D - 03$
$D = -1.55306D - 02$                  $E = -7.02882D - 03$

| Variable | Focal Length | | |
|---|---|---|---|
| Separation | 1.00 | 3.93 | 9.46 |
| D8 | 0.06 | 2.09 | 2.95 |
| D14 | 3.14 | 1.11 | 0.24 |
| D17 | 1.21 | 0.52 | 1.24 |

Tilting Center at a distance of 7.824 from the lens surface R3.

TABLE 1

| Condition | Numerical Example | | |
|---|---|---|---|
| | 1 | 2 | 3 |
| \|f1b/L\| | 1.00 | 1.00 | 0.712 |
| \|f1b/fT\| | 0.590 | 0.571 | 0.595 |

While the foregoing embodiment employs the actuator so that the lens unit is forcibly tilted, the next embodiment makes use of a counterweight for moving the lens unit when the automatic correction is made.

Figure 18:
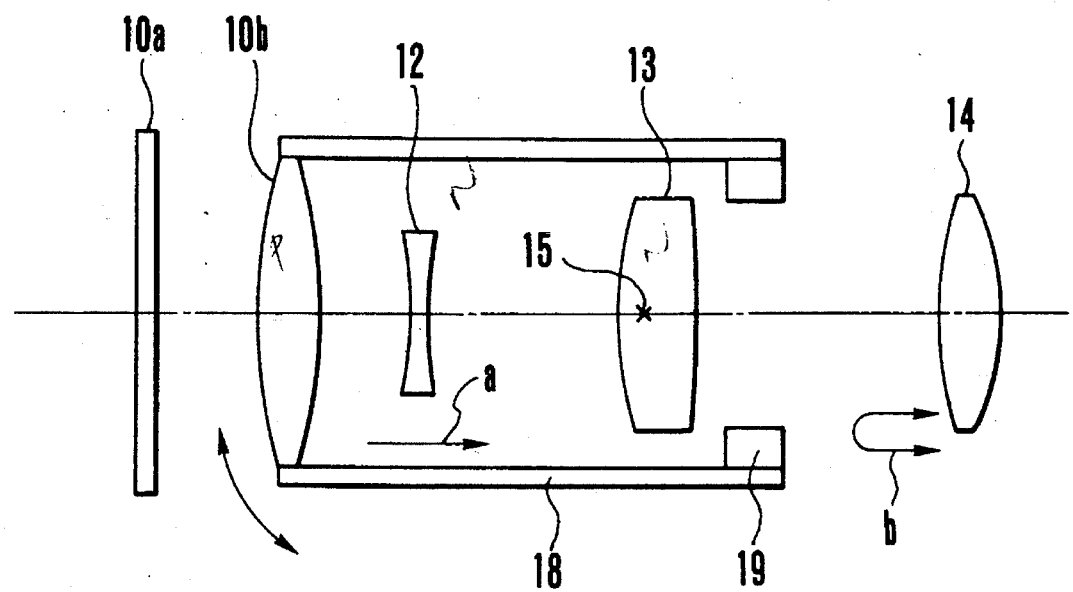
FIG. 18 is a diagram of the paraxial refractive power arrangement of an optical system according to another embodiment of the invention.

Referring to FIG. 18, a first lens unit 10b remains stationary during zooming and focusing and is arranged to tilt with its tilting-center at a point 15 on an optical axis which is distant from its rear principal point toward the image side by a distance almost equal to its focal length. Thus, the shaking of an image of an object being photographed (image shake) is corrected when the variable magnification optical system vibrates. In other words, the first lens unit 10b remains spatially stationary, even when the variable magnification optical system (i.e., the whole camera) vibrates.

A second lens unit 12 of negative refractive power moves along the optical axis to vary the magnification, constituting part of a zoom section. When varying the magnification, for example, from the wide-angle end to the telephoto end, the second lens unit 12 moves in the direction of an arrow "a".

A third lens unit 13 of positive refractive power is fixed. A fourth lens unit 14 of positive refractive power has both the function of compensating for the shift of an image plane with variation of the magnification and the function of focusing.

In the present embodiment, with an infinitely distant object or an object at a minimum distance in focus, when varying the magnification from the wide-angle end to the telephoto end, the fourth lens unit 14 moves axially in a locus convex toward the object side, as shown by a curve "b".

A lens unit 10a whose paraxial refractive power is almost zero remains stationary during variation of the magnification and during the image stabilizing operation and also serves as a protection glass. The rear surface of the lens unit 10a is formed to such an aspheric shape that a positive refractive power gets progressively stronger from a central portion thereof to a marginal portion thereof.

A counterweight 19 is mounted on an end of a holding member 18 which is arranged to hold the first lens unit 10b on the opposite end. The weight of the counterweight 19 is balanced with that of the first lens unit 10b at an equilibrium point which coincides with the point 15 about which the first lens unit 10b tilts to an angle depending on the inclination of the variable magnification optical system. Incidentally, a moving mechanism including the holding member 18 itself is not essential to the invention, so that its illustration is schematically depicted.

In the present embodiment, when the variable magnification optical system inclines, the first lens unit 10b is spatially held stationary by the counterweight 19. That is, the first lens unit 10b continues to hold the first attitude.

Figure 20:
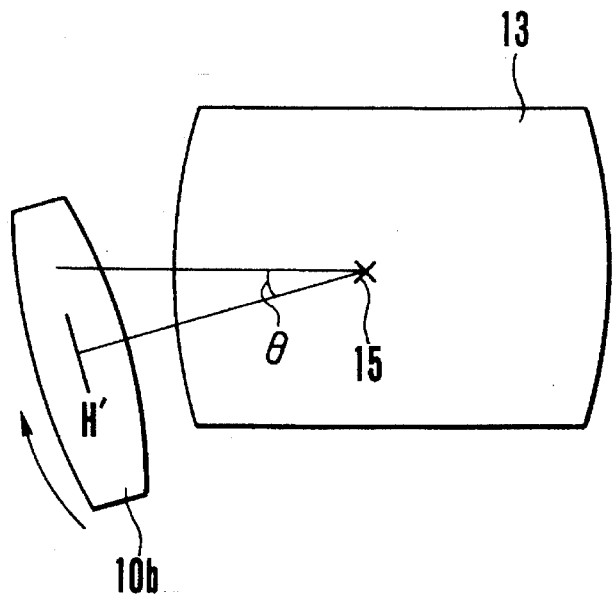
FIG. 20 is a diagram for explaining the principle of the optical system that works in the image stabilizing operation.

The principle of image stabilization for the optical system of the invention is explained by using FIG. 20. In FIG. 20, the same reference numerals are employed to denote the same elements as those in FIG. 18. As the variable magnification optical system vibrates, the first lens unit (correcting lens unit) 10b relatively tilts about the point 15 on the optical-axis to an angle of, for example, Θ.

Now, assume that the first lens unit 10b has a focal length f1 and the entire lens system has a focal length f. Supposing a camera shake to an angle of ω degrees (vibration of the variable magnification optical system) has occurred, the amount Δ of movement of a photographed image (object image) on the image plane is given by the following expression:

$$\Delta = f \cdot \cos \omega \qquad (3).$$

In this instance, the sensitivity $h_S$ to the decentering of the first lens unit 10b (ratio of the amount of decentering of the first lens unit 10b to the amount of movement of the photographed image) is defined as follows:

$$h_s = f/f_1 \quad (4)$$

From the equations (3) and (4), therefore, the amount of decentering of the first lens unit 10b required for correcting the camera shake (as measured in the direction perpendicular to the optical axis) is obtained as follows:

$$\Delta = f \cdot \cos \omega = (f/f_1) \cdot E \quad (5)$$

Here, supposing, for example, the distance from a principal point of the first lens unit 10b to the tilting center thereof on the image side is L, and the angle of correction required for the first lens unit 10b is $\Theta$, the following equation is obtained:

$$E = L \cdot \tan \Theta \quad (6)$$

From the equations (5) and (6), $$f \cdot \tan \omega = (f/f_1) L \cdot \tan \omega \therefore f_1 \cdot \tan \omega = L \cdot \tan \omega \quad (7)$$

Here, putting $$L = f_1 \quad (8)$$

the following equation is obtained:

$$\omega = \Theta.$$

Thus, the angle $\omega$ of shaking of the camera and the angle of tilting $\Theta$ required for the first lens unit 10b fall in coincidence with each other.

Based on the principle described above, therefore, in the present embodiment, the first lens unit 10b is supported to spatially stand still by taking the point away from its principal point by a distance equal to its focal length as a fulcrum, so that the image is thus stabilized against the camera shake.

In other words, the first lens unit 10b is used for stabilizing the image as arranged to tilt by a required amount about the point 15 on the optical axis. Compared with the prior known image-stabilizing optical systems, there is no need to use any newly additional optical member for image stabilization such as the lens group or variable angle prism.

To maintain good stability of optical performance against the image stabilizing operation, the present embodiment makes use of the lens unit 10a on the object side of the first lens unit 10b, as arranged to remain stationary during the image stabilizing operation so as to correct the decentering aberrations.

In addition, the rear surface of this fixed lens unit 10a is formed to such an aspheric shape that, as described before, a positive refractive power gets stronger toward the marginal portion. With the help of this aspheric surface, the decentering aberrations caused by the image stabilizing operation, particularly, decentering coma on the telephoto side, are corrected well.

It is to be noted that this fixed lens unit 10a also functions to protect the variable magnification optical system against direct access of foreign matters from the outside, except for the external force that is treated by the image stabilization.

Figure 19:
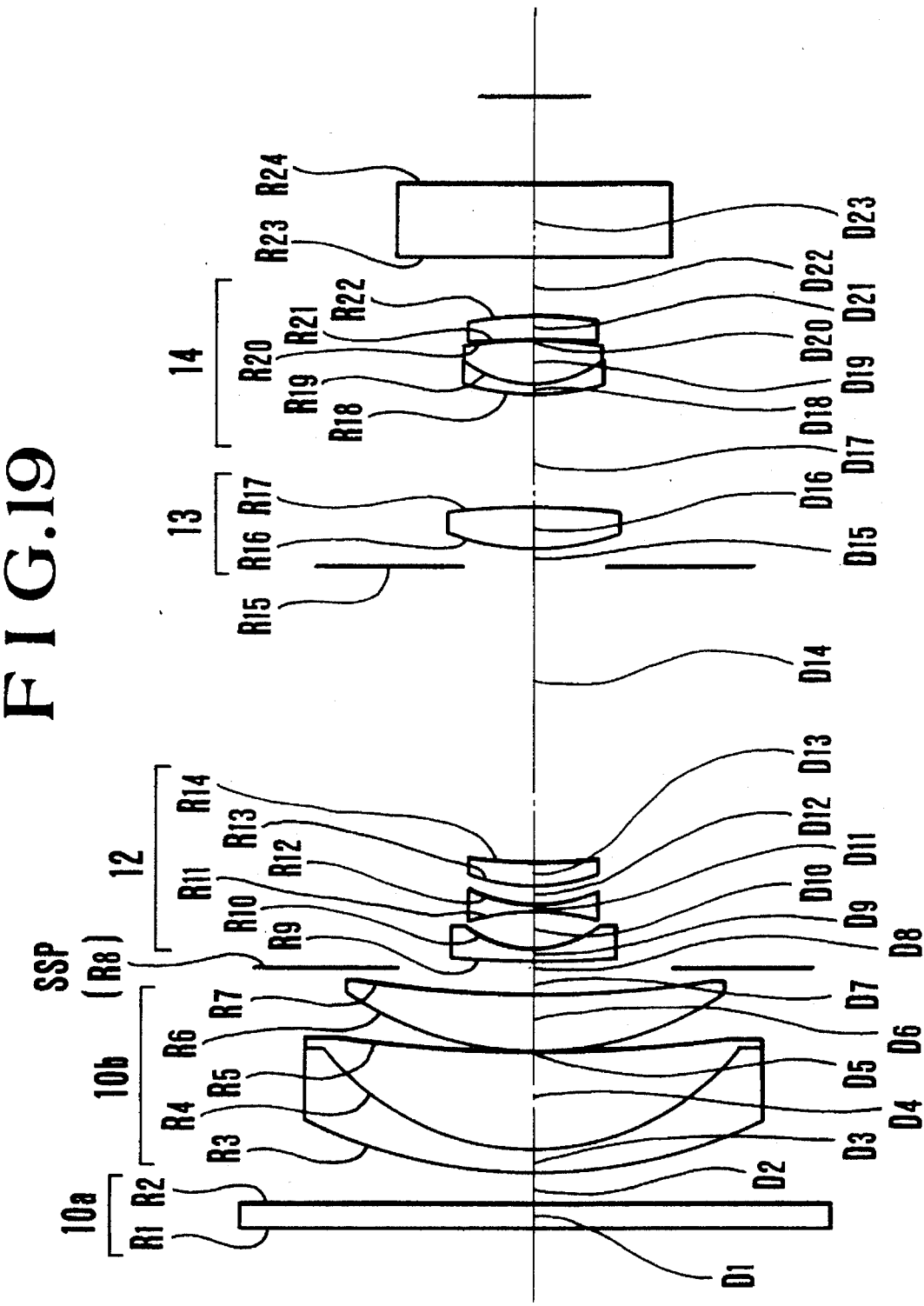
FIG. 19 is a lens block diagram of a numerical example 4 of the invention.

In FIG. 19, a fixed stop SSP is arranged in between the first lens unit 10b and the second lens unit 12 to suppress the range of variation of the illumination rate of the marginal zone on the image plane at the time of the image stabilizing operation to a minimum. Thus, a proper light intensity distribution over the entire area of the image plane can be obtained regardless of occurrence of the image stabilizing operation.

In the present embodiment, in order to minimize the size of the entire lens system in such a manner that good optical performance is maintained, the following condition is set forth:

$$0.45 < |f_1/fT| < 0.65 \quad (9)$$

where $f_1$ is the focal length of the first lens unit 10b and fT is the longest focal length of the entire lens system.

The inequalities of condition (9) give a proper range for the refractive power of the first lens unit 10b and have an aim chiefly to minimize the amount of decentering aberrations produced by displacing the first lens unit 10b for the purpose of stabilizing the image.

When the upper limit of the condition (9) is exceeded, as this means that the refractive power of the first lens unit 10b is too weak, the required amount of the first lens unit 10b to decenter for the stabilized image becomes large. As a result, the distance from the center of the lens surface of the first lens unit 10b to the optical axis becomes too long. This leads to an objectionable increase of the diameter of the first lens unit 10b.

When the refractive power of the first lens unit 10b is too strong beyond the lower limit of the condition (9), the amount of tilting required for the image stabilization becomes small, but the amount of decentering aberrations produced increases objectionably.

In the present embodiment, for the vibrations of the variable magnification optical system, the image stabilizing provision is made at the first lens unit 10b. Since this correcting lens unit holds itself spatially stationary, when in application to the real instrument, for example, a video camera, some measure must be taken in view of panning, where the camera housing comes close in part to the correcting lens unit.

On this account, therefore, in the present embodiment, a means is provided for controlling the external force on the variable magnification optical system so that the correcting lens unit does not interfere with the camera housing.

The image-stabilizing optical systems of the pendulum applied type as in the invention have a disadvantage that, for example, as the size and weight of the system decrease, the rate of suppression of the image shake for the vibrations of low frequencies decreases owing to the influence of friction or the like.

For such a case, the aforesaid measure of applying force is also employed to control the image-stabilizing optical system. Thus, the image stabilization is realized advantageously.

Figure 21:
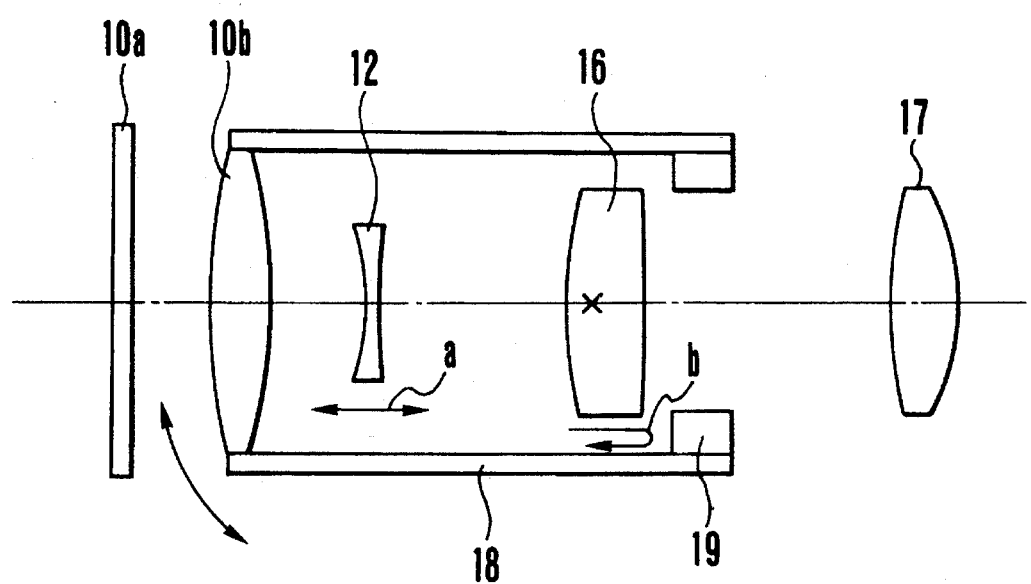
FIG. 21 is a diagram of the paraxial refractive power arrangement of an optical system according to a further embodiment of the invention.
Figure 22:
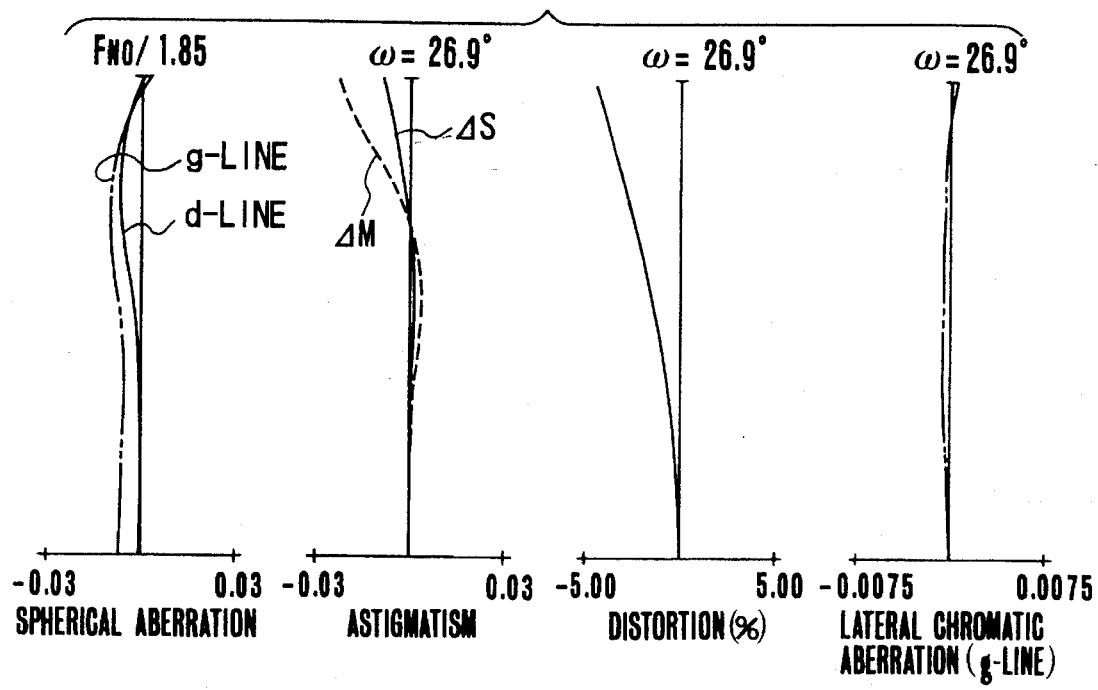
FIG. 22 shows graphic representations of the various aberrations of the numerical example 4 in the wide-angle end.
Figure 23:
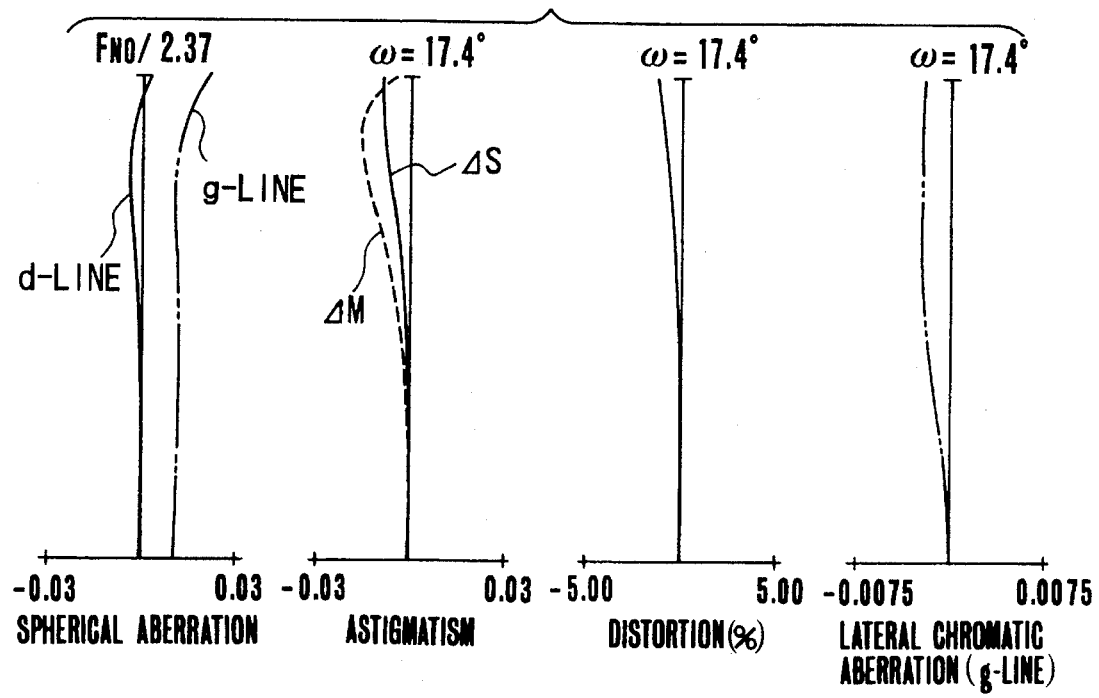
FIG. 23 shows graphic representations of the various aberrations of the numerical example 4 in an intermediate position.
Figure 24:
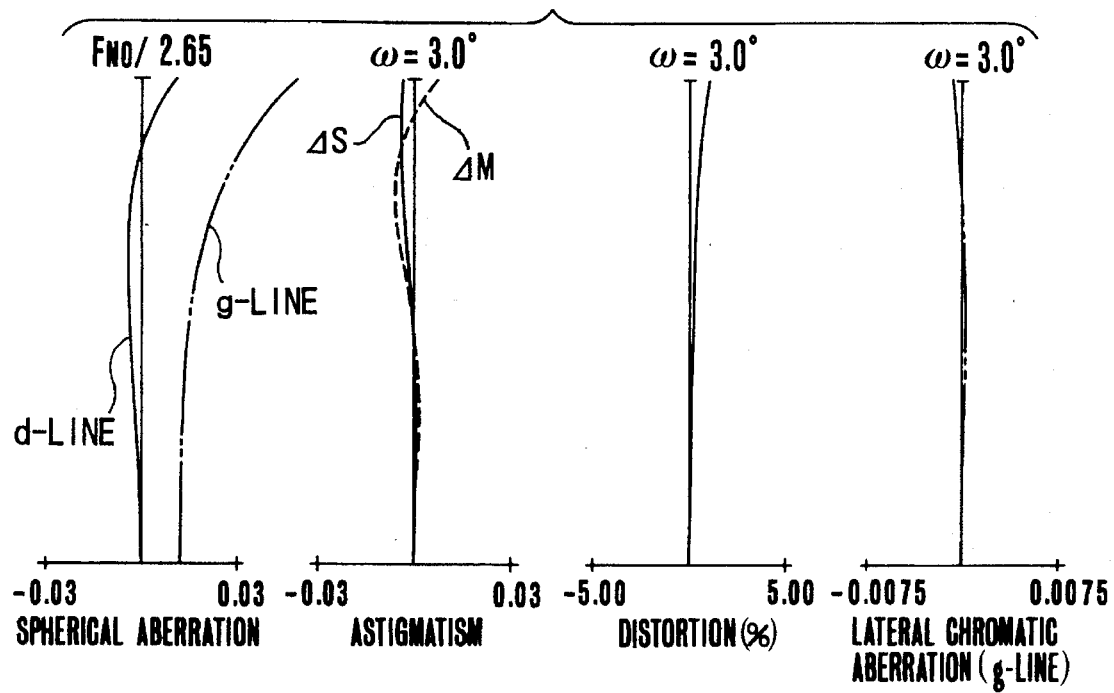
FIG. 24 shows graphic representations of the various aberrations of the numerical example 4 in the telephoto end.
Figure 25:
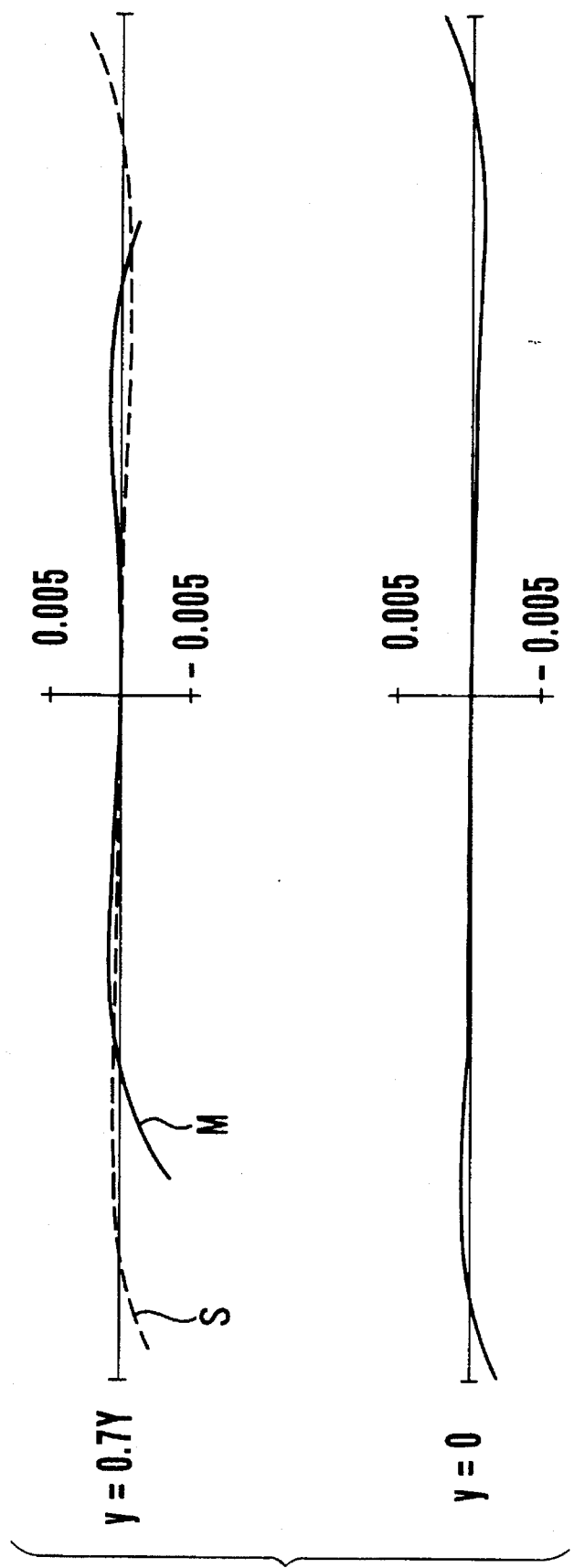
FIG. 25 shows the lateral aberrations of the numerical example 4 in the telephoto end when not decentered.
Figure 26:
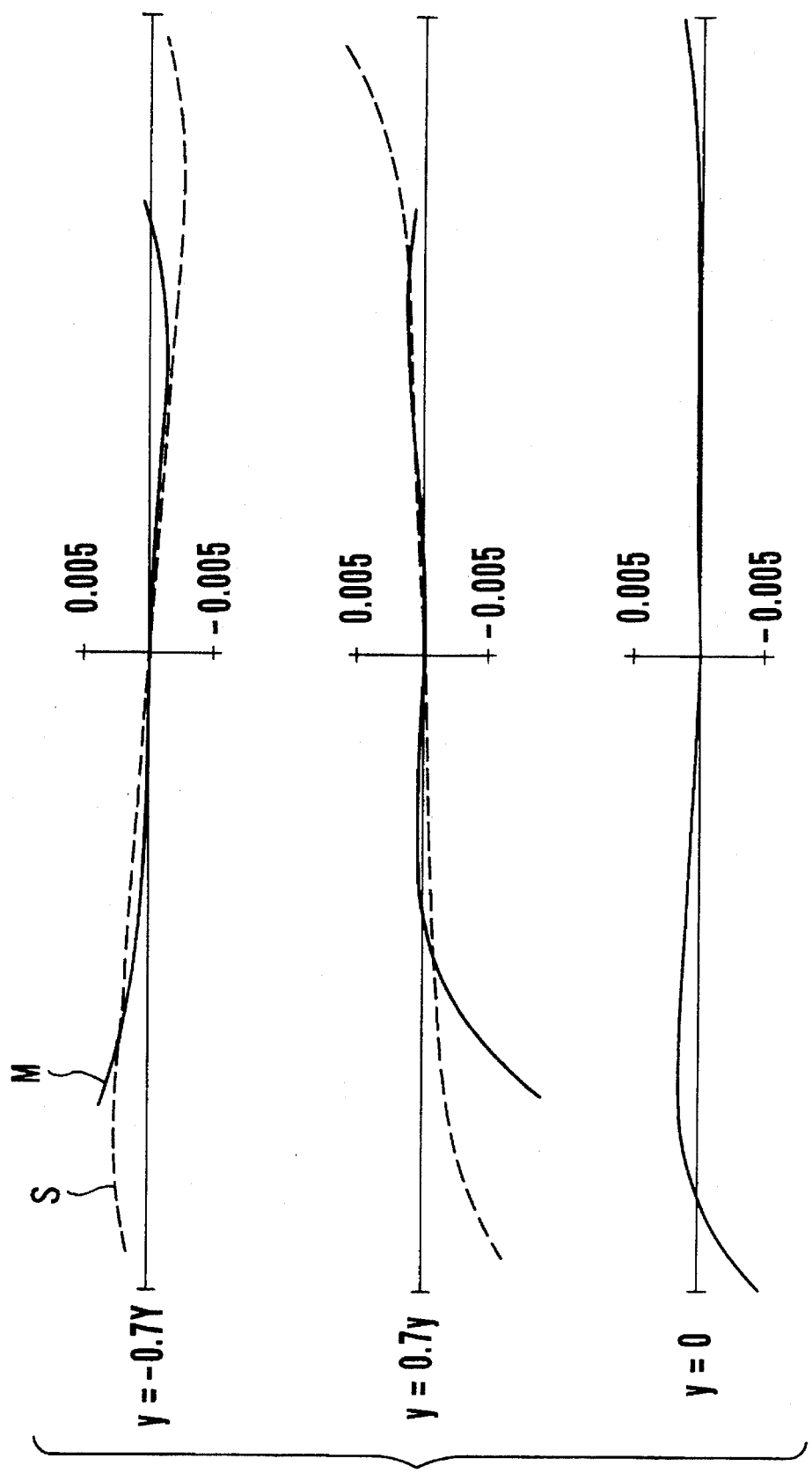
FIG. 26 shows the lateral aberrations of the numerical example 4 in the telephoto end with the shake angle of 2 degrees corrected.

Still another embodiment of the variable magnification optical system according to the invention is shown with the paraxial refractive power arrangement in FIG. 21, where the same elements as those of FIG. 18 are denoted by the same reference numerals.

In FIG. 21, a third lens unit 16 of positive refractive power has both the function of compensating for the shift of an image plane with variation of the magnification and the function of focusing. A fourth lens unit 17 of positive refractive power is fixed.

The present embodiment differs from the embodiments described above in that it is the third lens unit 16 that is axially moved as shown by an arrow "b" to compensate for the image shift with zooming and to perform focusing, and in that the fourth lens unit 17 is maintained stationary during zooming and focusing.

The other features and the principle of image stabilization herein used are almost the same as those of the foregoing embodiments, and similar results are attained.

It will be appreciated that according to the invention applied to the variable magnification optical system wherein at least one of a plurality of lens units on the image side of the second lens unit (the variator) is axially moved to perform both compensation for the image shift and focusing, the image stabilizing operation is performed by tilting the first lens unit about a point which lies on the optical axis and is distant from its rear principal point toward the image side by a distance almost equal to its focal length. Thus, the image stabilizing effect is produced, while still permitting good optical performance to be achieved.

The embodiment described above may be employed also in the numerical examples 1 and 2, but is further practiced in the following numerical example 4. In the numerical data for the example 4, Ri is the radius of curvature of the i-th lens surface, when counted from the object side, Di is the i-th lens thickness or air separation, and Ni and vi are respectively the refractive index and Abbe number of the glass of the i-th lens element. The values of the factor in the condition (9) for the numerical examples 1, 2 and 4 are listed in Table-2.

Incidentally, R23 and R24 in the numerical example 4 define a glass member (parallel flat plate) such as a face plate.

Numerical Example 4:
F = 1–9.59    FNO = 1:1.85–2.65    2 ω = 53.9°–6.0°

| | | | |
|---|---|---|---|
| R1 = ∞ | D1 = 0.2697 | N1 = 1.58313 | v1 = 59.4 |
| R2 = Aspherical | D2 = 0.32 | | |
| R3 = 5.868 | D3 = 0.2379 | N2 = 1.80518 | v2 = 25.4 |
| R4 = 2.992 | D4 = 1.0311 | N3 = 1.62280 | v3 = 57.1 |
| R5 = 17.259 | D5 = 0.0317 | | |
| R6 = 3.917 | D6 = 0.5711 | N4 = 1.77250 | v4 = 49.6 |
| R7 = 12.690 | D7 = 0.28 | | |
| R8 = Fixed Stop | D8 = Variable | | |
| R9 = 10.114 | D9 = 0.1110 | N5 = 1.77250 | v5 = 49.6 |
| R10 = 1.201 | D10 = 0.3855 | | |
| R11 = –3.051 | D11 = 0.1110 | N6 = 1.69680 | v6 = 55.5 |
| R12 = 1.587 | D12 = 0.1745 | | |
| R13 = 1.949 | D13 = 0.2697 | N7 = 1.84666 | v7 = 23.8 |
| R14 = 8.539 | D14 = Variable | | |
| R15 = Aperture Stop | D15 = 0.1745 | | |
| R16 = 2.340 | D16 = 0.4442 | N8 = 1.58313 | v8 = 59.4 |
| R17 = –9.130 | D17 = 1.2036 | | |
| R18 = 2.487 | D18 = 0.0952 | N9 = 1.84666 | v9 = 23.8 |
| R19 = 1.213 | D19 = 0.4759 | N10 = 1.51633 | v10 = 64.2 |
| R20 = –8.578 | D20 = 0.0238 | | |
| R21 = 61.497 | D21 = 0.2697 | N11 = 1.60311 | v11 = 60.7 |
| R22 = –4.232 | D22 = 0.6345 | | |
| R23 = ∞ | D23 = 0.7931 | N12 = 1.51633 | v12 = 64.2 |
| R24 = ∞ | | | |

| Variable | Focal Length | | |
|---|---|---|---|
| Separation | 1.00 | 3.90 | 9.59 |
| D8 | 0.07 | 2.16 | 3.05 |
| D14 | 3.25 | 1.16 | 0.27 |
| D18 | 0.89 | 0.30 | 1.10 |

Tilting Center at a distance of 6.772 from the lens surface R3.

R2: Aspheric Surface
$R_0$ = ∞    K = 0    B = –1.503D – 04
R17: Aspheric Surface
$R_0$ = 2.340    K = 3.307D + 00
B = –5.602D – 02    C = –8.296D – 03
D = –1.426D – 02    E = –9.769D – 03

TABLE 2

| | Numerical Example | | |
|---|---|---|---|
| Condition | 1 | 2 | 4 |
| $|f_1/fT|$ | 0.590 | 0.571 | 0.590 |

What is claimed is:

1. A variable magnification optical system comprising:
   means for varying the magnification, on the object side of which a lens unit is provided and arranged to be stationary during variation of the magnification and during focusing, said lens unit comprising a front lens sub-unit arranged to be fixed and a rear lens sub-unit arranged to tilt with a tilting center thereof at a point on an optical axis so as to correct for image shake, at least one lens surface in said front lens sub-unit being formed to such an aspheric shape that a positive refractive power gets progressively stronger from a central portion thereof toward a marginal portion thereof, wherein the following conditions are satisfied:

$0.5 < |f1b/L| < 1.2$ $0.53 < |f1b/fT| < 0.65$, where f1b is the focal length of said rear lens sub-unit, L is the distance from a rear principal point of said rear lens sub-unit to the tilting center, and fT is a focal length of the variable magnification optical system at a telephoto end.

2. A variable magnification optical system according to claim 1, wherein said means for varying the magnification comprises a lens unit of negative refractive power for varying the magnification, a fixed lens unit of positive refractive power, and a lens unit of positive refractive power for both focusing and compensating for the shift of an image plane with variation of the magnification.

3. A variable magnification optical system comprising:
   means for varying the magnification, on the object side of which a lens unit is provided and arranged to be stationary during variation of the magnification and during focusing, and at least one lens unit on the image side is provided, said lens unit on the object side being held spatially stationary by tilting around a point which lies on an optical axis and is distant from its rear principal point toward the image side by a distance almost equal to its focal length so that a photographed image is stabilized when said variable magnification optical system vibrates, focusing being performed by moving at least one of said lens units on the image side included in said means for varying the magnification.

4. A variable magnification optical system according to claim 3, wherein said means for varying the magnification comprises a lens unit of negative refractive power for varying the magnification, a first lens unit of positive refractive power and a second lens unit of positive refractive power, wherein one of said first lens unit of positive refractive power and said second lens unit of positive refractive power moves along the optical axis to compensate for the shift of an image plane with variation of the magnification and to perform focusing.

5. A variable magnification optical system according to claim 3, further comprising a front lens unit whose refractive power in a paraxial zone is substantially zero, on the object side of said spatially stationary lens unit.

6. A variable magnification optical system according to claim 3, wherein the following condition is satisfied:

$$0.45 < |f_1/fT| < 0.65,$$

where $f_1$ is the focal length of said spatially stationary lens unit and fT is the focal length in a telephoto end of said variable magnification optical system.

7. A variable magnification optical system, comprising from the object side:

a front lens unit, a rear lens unit which tilts around a predetermined point on the optical axis to stabilize an image, and a plurality of lens units which move along the optical axis to vary magnification, wherein the following condition is satisfied:

$$0.53 < |f1b/fT| < 0.65,$$

wherein f1b represents the focal length of the rear lens unit, and fT is a focal length of the variable magnification optical system at a telephoto end.

8. A system according to claim 7, wherein the front lens unit has a non-spherical lens surface.

9. A system according to claim 8, wherein the non-spherical lens surface has such a shape that the positive refractive power increases as the height from the optical axis increases.

10. A system according to claim 7, which satisfies the following condition:

$$0.5 < |f1b/L| < 1.2,$$

wherein L represents a distance from the rear principal point to the predetermined point on the optical axis.

* * * * *

UNITED STATES PATENT AND TRADEMARK OFFICE
CERTIFICATE OF CORRECTION

PATENT NO. : 5,521,758
DATED : May 28, 1996
INVENTOR(S) : HIROYUKI HAMANO

It is certified that error appears in the above-indentified patent and that said Letters Patent is hereby corrected as shown below:

On the title page: Item

[56] U.S. PATENT DOCUMENTS

Line 4, "Tsuji" should read --Tsuji, et al.--; and

Line 5, "Tsuji, et al." should read --Hamano, et al.--.

COLUMN 10

Line 53, "optical-axis" should read --optical axis--.

COLUMN 11

Line 18, "$f \cdot \tan \omega = (f/f_1) L \cdot \tan \omega \therefore f_1 \cdot \tan \omega = L \cdot \tan \omega$" should read  --$f \cdot \tan \omega = (f/f_1) L \cdot \tan \theta$
$\therefore f_1 \cdot \tan \omega = L \cdot \tan \theta$--.

Signed and Sealed this

Seventh Day of January, 1997

Attest:

BRUCE LEHMAN

*Attesting Officer*   *Commissioner of Patents and Trademarks*